(12) United States Patent
Yoshida

(10) Patent No.: US 10,509,537 B2
(45) Date of Patent: Dec. 17, 2019

(54) DISPLAY CONTROL APPARATUS, DISPLAY CONTROL METHOD, AND PROGRAM

(71) Applicant: SONY CORPORATION, Tokyo (JP)

(72) Inventor: Yuya Yoshida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 259 days.

(21) Appl. No.: 14/427,381

(22) PCT Filed: Sep. 26, 2013

(86) PCT No.: PCT/JP2013/076035
§ 371 (c)(1),
(2) Date: Mar. 11, 2015

(87) PCT Pub. No.: WO2014/057814
PCT Pub. Date: Apr. 17, 2014

(65) Prior Publication Data
US 2015/0234551 A1 Aug. 20, 2015

(30) Foreign Application Priority Data

Oct. 12, 2012 (JP) .................................. 2012-226788

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/0481* (2013.01); *G06F 3/0488* (2013.01);
(Continued)

(58) Field of Classification Search
CPC ............... G06F 3/04812; G06F 3/0482; G06F 3/04842; G06F 3/04847
See application file for complete search history.

(56) References Cited

U.S. PATENT DOCUMENTS 4,783,648 A * 11/1988 Homma ................... G09G 5/14
715/794
5,140,678 A * 8/1992 Torres ................... G06F 3/0481
715/776
(Continued)

FOREIGN PATENT DOCUMENTS

| JP | 05-324239 | 12/1993 |
| JP | 08-255066 | 10/1996 |
| JP | 2000-207090 | 7/2000 |

OTHER PUBLICATIONS

May 27, 2016, European Search Report for related EP Application No. 13844730.5.

*Primary Examiner* — Seth A Silverman
(74) *Attorney, Agent, or Firm* — Paratus Law Group, PLLC

(57) ABSTRACT

Provided is a display control apparatus including a detection unit configured to detect a user operation, and a window control unit configured to display a plurality of application windows on a screen, and control display of each application window based on the user operation detected by the detection unit. If it is determined that it is difficult to identify a first application window associated with a first application due to at least a portion of the first application window being hidden by a second application window, the window control unit is configured to control display of the first application window so that identification information for identifying the first application is visible to a user.

25 Claims, 20 Drawing Sheets

(51) Int. Cl.
 *G06F 3/0481* (2013.01)
 *G06F 3/0484* (2013.01)

(52) U.S. Cl.
 CPC ...... *G06F 3/04817* (2013.01); *G06F 3/04842* (2013.01); *G06F 3/04847* (2013.01); *G06F 3/04883* (2013.01)

(56) References Cited

U.S. PATENT DOCUMENTS

| | | | |
|---|---|---|---|
| 5,179,655 A | | 1/1993 | Noguchi et al. |
| 5,305,435 A | * | 4/1994 | Bronson ............... G06F 3/0481 715/775 |
| 5,841,436 A | * | 11/1998 | Nakamura ............ G06F 3/0481 715/790 |
| 2003/0142139 A1 | * | 7/2003 | Brown ................... G06F 3/0481 715/800 |
| 2006/0075359 A1 | | 4/2006 | Bauchot et al. |
| 2006/0253791 A1 | * | 11/2006 | Kuiken ................. G06F 3/0481 715/766 |
| 2009/0125839 A1 | * | 5/2009 | Kano ...................... G06F 3/048 715/788 |

* cited by examiner

FIG.6A

| DATA ITEM | DATA EXAMPLE |
|---|---|
| APPLICATION ID | AP01 |
| INITIAL POSITION | $(X_I, Y_I)$ |
| INITIAL SIZE | $(W_I, H_I)$ |
| CURRENT POSITION | $(X_C, Y_C)$ |
| CURRENT SIZE | $(W_C, H_C)$ |
| LAYOUT ID | WL1 |
| PRIORITY LEVEL | 5 |

FIG.6B

| DATA ITEM | DATA EXAMPLE |
|---|---|
| APPLICATION ID | AP01 |
| INITIAL POSITION | $(X_I, Y_I)$ |
| INITIAL SIZE | $(W_I, H_I)$ |
| CURRENT POSITION | $(X_C, Y_C)$ |
| CURRENT SIZE | $(W_C, H_C)$ |
| IR POSITION | $(U_R, V_R)$ |
| IR SIZE | $(W_R, H_R)$ |
| IR TYPE | THUMBNAIL |

IR : IDENTIFICATION REGION

DISPLAY CONTROL APPARATUS, DISPLAY CONTROL METHOD, AND PROGRAM

CROSS REFERENCE TO PRIOR APPLICATION

This application is a National Stage Patent Application of PCT International Patent Application No. PCT/JP2013/076035 (filed on Sep. 26, 2013) under 35 U.S.C. § 371, which claims priority to Japanese Patent Application No. 2012-226788 (filed on Oct. 12, 2012), which are all hereby incorporated by reference in their entirety.

TECHNICAL FIELD

The present disclosure relates to a display control apparatus, a display control method, and a program.

BACKGROUND ART

In the related art, a method is known of displaying a so-called taskbar on a screen of a computer capable of executing a plurality of applications, and providing a user interface for switching display of an application window and the like via the taskbar (e.g., see Patent Literature 1 below).

CITATION LIST

Patent Literature

Patent Literature 1; JP H08-255066A

SUMMARY OF INVENTION

Technical Problem

However, for a portable or a compact electronic device that does not have much display space, for example, in many cases a function for displaying the taskbar is omitted. If a taskbar is not displayed, it is difficult for the user to appropriately grasp the application windows that are hidden when a plurality of application windows overlap each other.

Therefore, it is desirable for a way to be provided for the user to appropriately grasp the plurality of application windows even when a taskbar is not displayed.

Solution to Problem

According to the present disclosure, there is provided a display control apparatus including a detection unit configured to detect a user operation, and a window control unit configured to display a plurality of application windows on a screen, and control display of each application window based on the user operation detected by the detection unit. If it is determined that it is difficult to identify a first application window associated with a first application due to at least a portion of the first application window being hidden by a second application window, the window control unit is configured to control display of the first application window so that identification information for identifying the first application is visible to a user.

Further, according to the present disclosure, there is provided a method of controlling display of each of a plurality of application windows based on a user operation in a display control apparatus configured to display the plurality of application windows, the method including determining whether it is difficult to identify a first application window associated with a first application due to at least a portion of the first application window being hidden by a second application window, and controlling display of the first application window so that identification information for identifying the first application is visible to a user if it is determined that it is difficult to identify the first application.

Further, according to the present disclosure, there is provided a program for causing a computer in a display control apparatus configured to display a plurality of application windows on a screen to function as a detection unit configured to detect a user operation, and a window control unit configured to display a plurality of application windows on a screen, and control display of each application window based on the user operation detected by the detection unit. If it is determined that it is difficult to identify a first application window associated with a first application due to at least a portion of the first application window being hidden by a second application window, the window control unit is configured to control display of the first application window so that identification information for identifying the first application is visible to a user.

Advantageous Effects of Invention

Based on the technology according to the present disclosure, a way is provided for the user to appropriately grasp the plurality of application windows even when a taskbar is not displayed.

DESCRIPTION OF EMBODIMENTS

Figure 1:
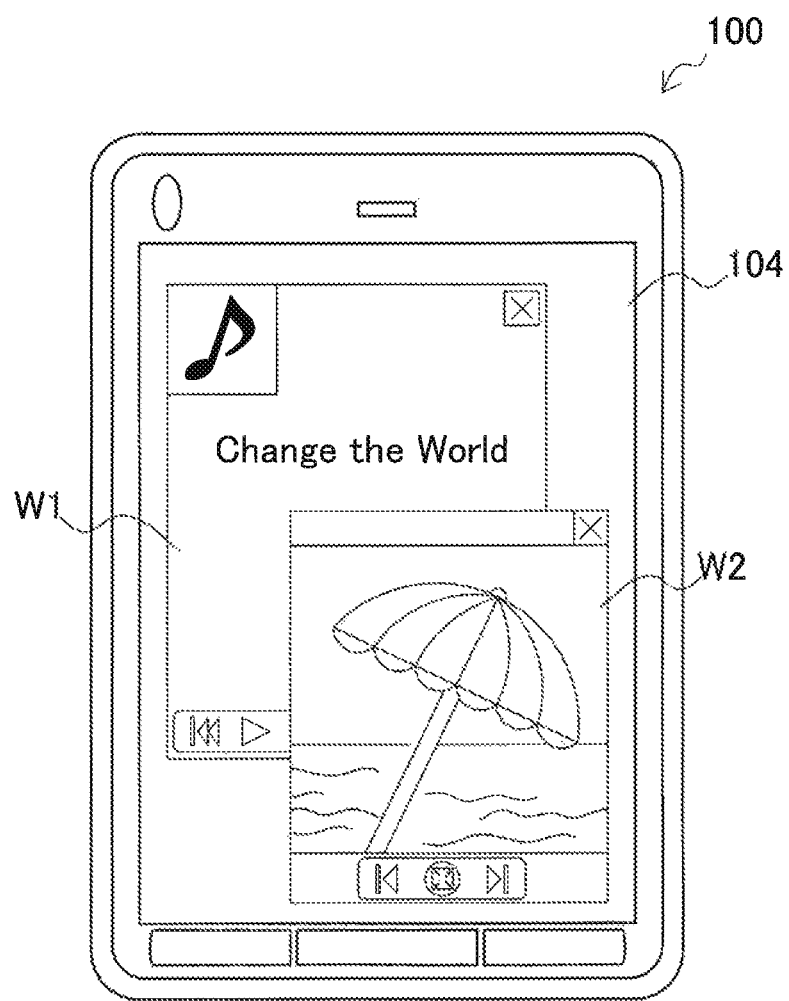
FIG. 1 is an explanatory diagram illustrating an outline of a display control apparatus according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Outline
2. Display Control Apparatus Configuration Example
2-1. Hardware Configuration
2-2. Function Configuration
2-3. Window Control Scenarios
3. Example of Processing Flow
4. Summary
1. Outline FIG. 1 is an explanatory diagram illustrating an outline of a display control apparatus 100 according to an embodiment. In FIG. 1, an appearance of the display control apparatus 100 is illustrated. The display control apparatus 100 includes a display 104. On the display 104, an application window W1 and an application window W2 are displayed. The application window W1 is associated with a first application. The application window W2 is associated with a second application. The first application and the second application may the same type of application, or different types of application. In the example illustrated in FIG. 1, the first application is a music playback application, and the second application is an image playback application.

As can be understood from the example illustrated in FIG. 1, the display control apparatus 100 includes a windows framework for supporting multiple windows. This windows framework may be, for example, a function of the operating system of the display control apparatus 100, or may be a function of middleware or an application additionally installed in the display control apparatus 100. In this windows framework, a taskbar is not displayed. In addition to a content region, each application window includes an identification region for identifying an application. The user grasps which window corresponds to which application by visually looking at the identification region.

Figure 2A:
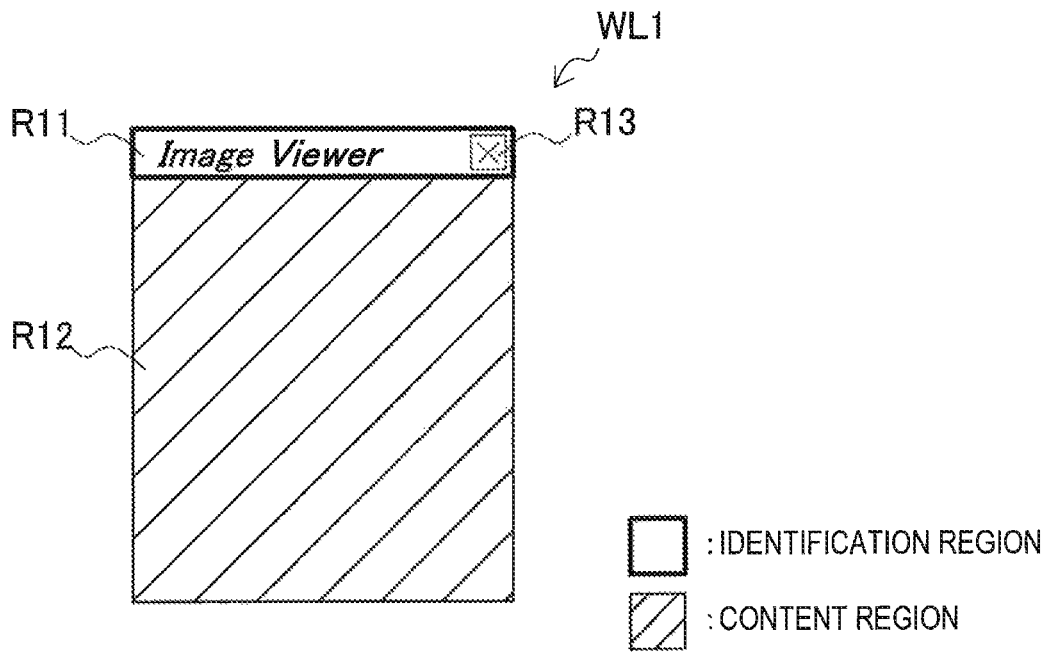
FIG. 2A is an explanatory diagram illustrating a first example of a window layout.

FIG. 2A is an explanatory diagram illustrating a first example of a window layout of the application windows that can be displayed according to the present embodiment. in the first example illustrated in FIG. 2A, a window layout WL1 includes an identification region R11, a content region R12, and a control button R13. In the first example, the identification region R11 is a rectangular text area arranged along an upper side of the window. The name of the application is displayed using this text area. The identification region R11 may also be arranged along another side of the window instead of the upper side. The shape of the identification region may be a shape other than a rectangular shape. In the text area, the name of the content (a file name etc.) may be displayed instead of the name of the application, The content region R12 displays the content of the application. The control button R13 is a user interface commonly arranged on a plurality of application windows in order to control the applications. For example, a function for closing an application, for example, may be allocated to the control button R13.

Figure 2B:
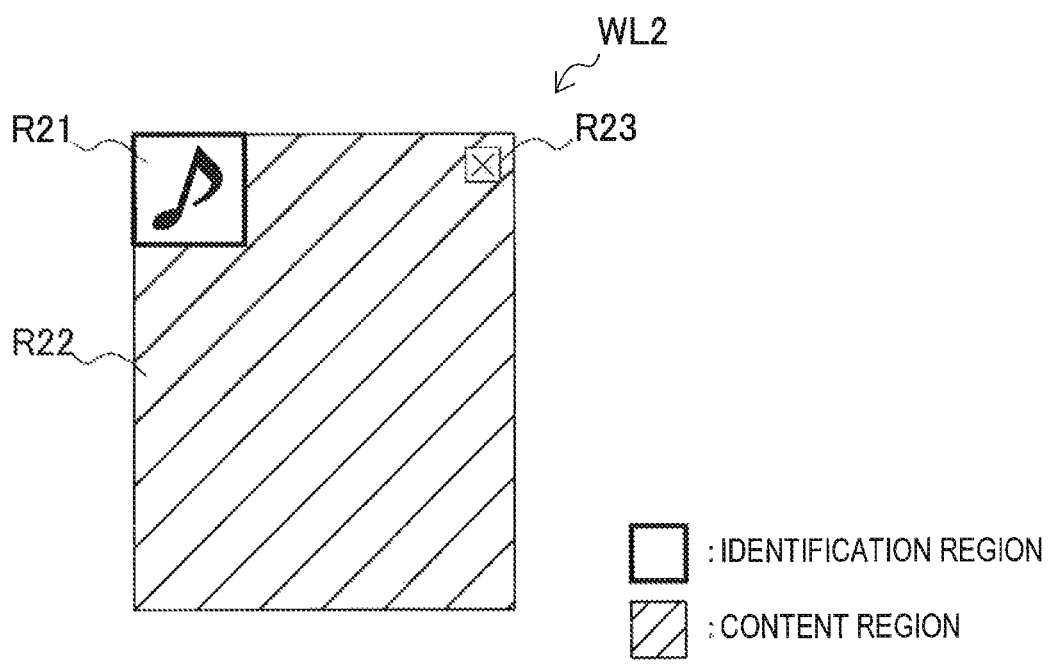
FIG. 2B is an explanatory diagram illustrating a second example of a window layout.

FIG. 2B is an explanatory diagram illustrating a second example of a window layout of the application windows that can be displayed according to the present embodiment. In the second example illustrated in FIG. 2B, a window layout WL2 includes an identification region R21, a content region R22, and a control button R23. In the second example, the identification region R21 is a rectangular region arranged at the upper left corner of the window An application icon may be displayed using this region. The identification region R21 may also be arranged in another corner of the window instead of the upper left corner. Here too, the shape of the identification region may be a shape other than a rectangular shape.

Figure 3A:
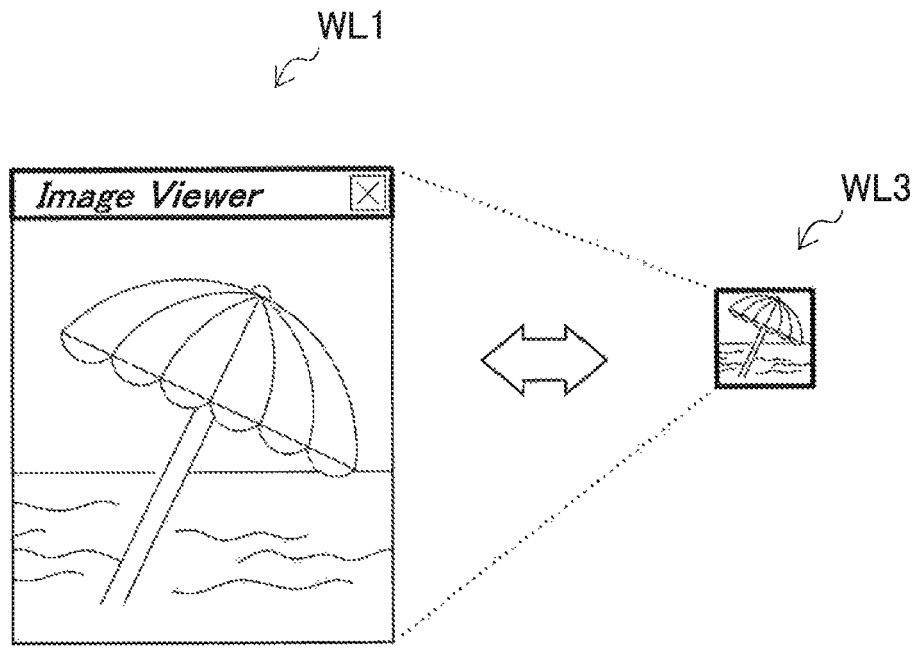
FIG. 3A is a first explanatory diagram illustrating a change in a window layout.
Figure 3B:
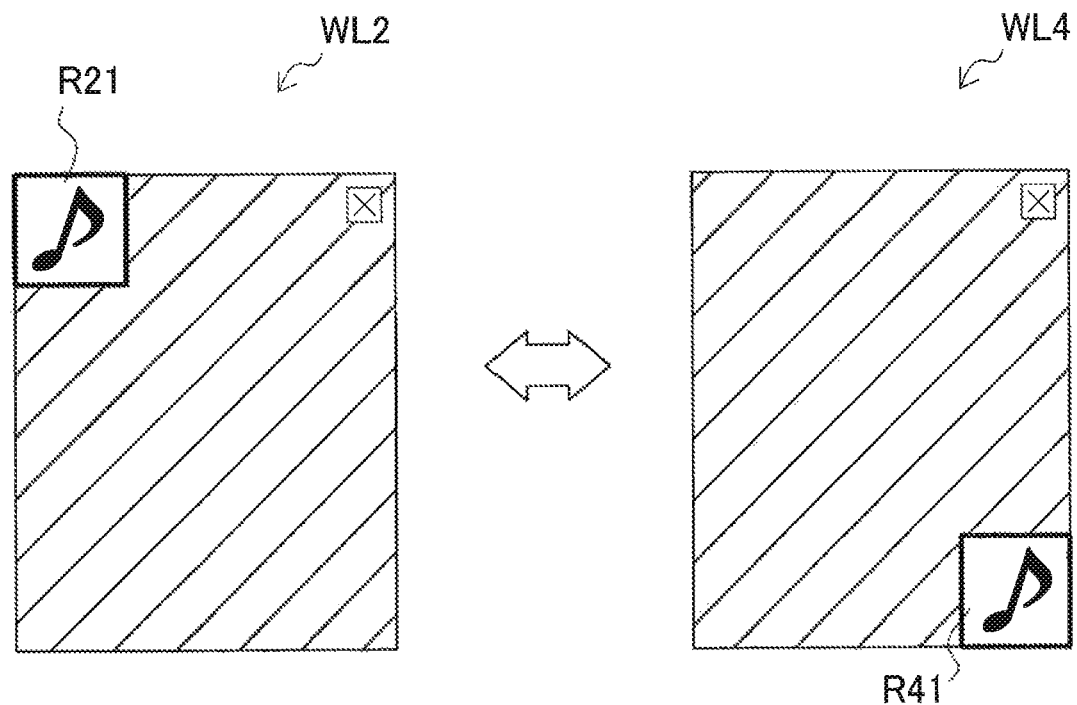
FIG. 3B is a second explanatory diagram illustrating a change in as window layout.

In the present embodiment, the window layout may be changed during execution of an application. FIGS. 3A and 3B are explanatory diagrams illustrating a change in the window layout. The window layout WL1 is again illustrated on the left of FIG. 3A. On the other hand, a window layout WL3 is illustrated on the right of FIG. 3A. The window layout WL3 only has an identification region. A content thumbnail is displayed using this identification region. Based on a user operation, the window layout WL1 can be changed to the window layout WL3, or the window layout WL3 can be changed to the window layout WL1. The window layout WL2 is again illustrated on the left of FIG. 3B. On the other hand, a window layout WL4 is illustrated on the right of FIG. 3B. In the window layout WL4, an identification region 41 is arranged in the lower right corner of the window Based on a user operation, the window layout WL2 can be changed to the window layout WL4, or the window layout WL4 can be changed to the window layout WL2. It is noted that the combinations of window layouts described here are merely an example.

As described above, in the window framework of the display control apparatus 100, a taskbar is not displayed on the display 104. Instead of displaying a taskbar, the user can identify each application and manage the application windows by looking at the identification region of each application window. However, a portable or a compact electronic device often does not have much display space. Consequently, a situation can arise in which a plurality of application windows overlap each other. Under such circumstances, if it is difficult to identify an application window due to the application window being hidden, user activities made via the application window can be hindered. Accordingly, the display control apparatus 100 avoids a situation in which user activities are hindered based on a configuration that is described in detail below.

2. Display Control Apparatus Configuration Example

The display control apparatus 100 may be, for example, an image processing apparatus such as a personal computer (PC), a smartphone, a personal digital assistant (PDA), a digital camera, a content player, or a game terminal. Further, these devices may be mounted in the display control apparatus 100, or the display control apparatus 100 may be a module that remotely controls the display of these devices.

2-1. Hardware Configuration

Figure 4:
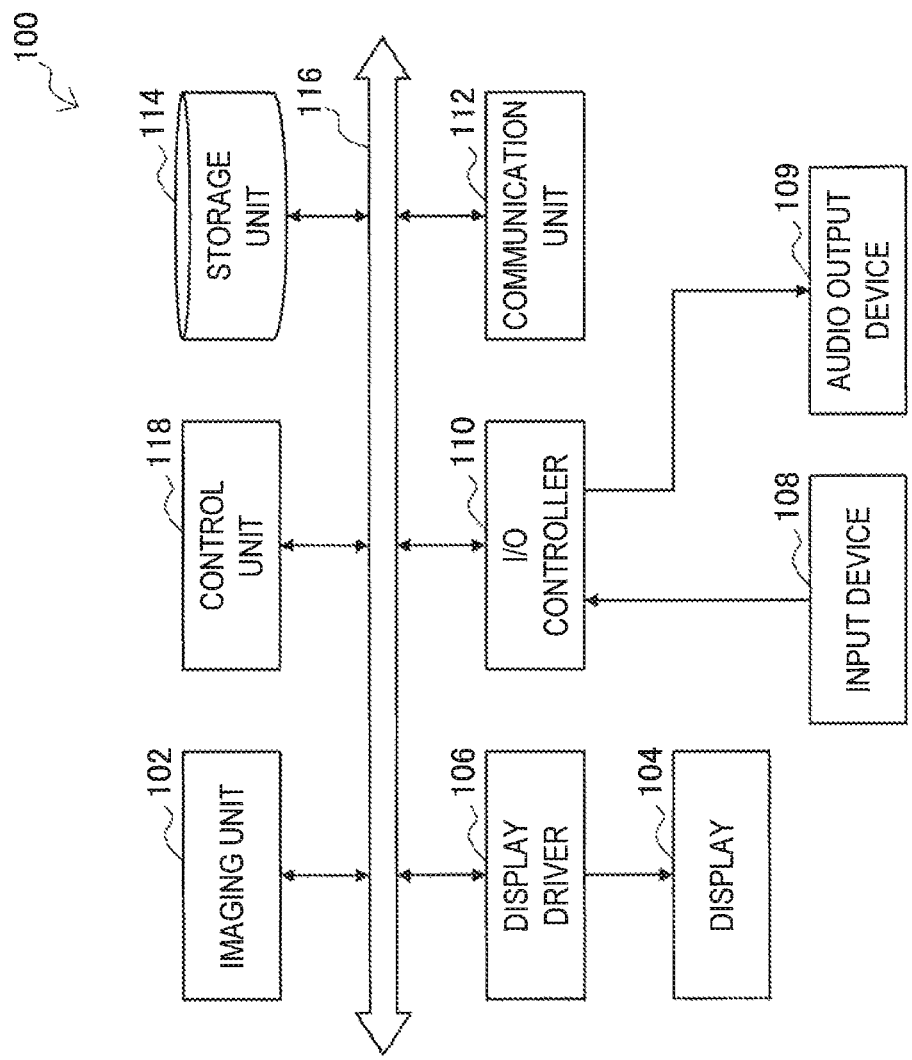
FIG. 4 is a block diagram illustrating an example of a hardware configuration of a display control apparatus according to an embodiment.

FIG. 4 is a block diagram illustrating an example of a hardware configuration of the display control apparatus 100 according to an embodiment. As illustrated in FIG. 4, the display control apparatus 100 includes an imaging. unit 102, the display 104, a display driver 106, an input device 108, an audio output device 109, an I/O controller 110, a communication unit 112, a storage unit 114, a bus 116, and a control unit 118.

(1) Imaging Unit

The imaging unit 102 is a camera module including an imaging element, such as a charge-coupled device (CCD) or a complementary metal oxide semiconductor (CMOS). The imaging unit 102 is configured to generate captured images by imaging real space.

(2) Display

The display 104 is a display module including a screen constructed from an liquid crystal display (LCD), an organic light-emitting diode (MED), or a cathode ray tube (CRT) and the like, The display 104 is driven by the display driver 106.

(3) Display Driver

The display driver 106 is a driver that drives the display 104. The display driver 106 drives the display 104 to display an output image generated by the control unit 118 on the screen of the display 104.

(4) input Device

The input device 108 is used by the user to operate the display control apparatus 100 or to input information into the display control apparatus 100. The input device 108 may include, for example, a touch sensor that is integrated with the display 104, Further, the input device 108 may also include a pointing device, such as a mouse or a touch pad. In addition, the input device 108 may also include various other types of devices, such as a keyboard, a keypad, buttons, a wheel and the like.

(5) Audio Output Device

The audio output device 109 is used by the display control apparatus 100 to output audio. Typically, the audio output device 109 may include a speaker. The input device 108 and the audio output device 109 are driven by the I/O controller 110.

(6) I/O Controller

The I/O controller 110 is a control module for controlling the input device 108 and the audio output device 109. The I/O controller 110 converts a signal input from the input device 108 into an input signal that can be interpreted by the control unit 118, and outputs the input signal to the control unit 118. Further, the I/O controller 110 causes a speaker of the audio output device 109 to play output audio generated by the control unit 118.

(7) Communication Unit

The communication unit 112 is a communication interface configured to mediate communication by the display control apparatus 100 with another apparatus. The communication unit 112 supports an arbitrary wireless communication protocol or wired communication protocol, and establishes a communication connection with another apparatus.

(8) Storage Unit

The storage unit 114, which is configured from a storage medium such as a semiconductor memory or a hard disk, stores programs and data for processing by the display control apparatus 100. The data to be stored by the storage unit 114 may be, for example, the data in a window database (DB), which is described below. Note that a portion of the programs and the data described in the present specification may be acquired from an external data source (e.g., a data server, network storage, or an external memory etc.), without being stored by the storage unit 114.

(9) Bus

The bus 116 connects the imaging unit 102, the display driver 106, the I/O controller 110, the communication unit 112, the storage unit 114, and the control unit 118 to each other.

(10) Control Unit The control unit 118 corresponds to a processor such as a central processing unit (CPU) or a digital signal processor (DSP). The control unit 118 activates various functions (which are described below) of the display control apparatus 100 by executing a program stored by the storage unit 114 or another storage medium.

2-2. Function Configuration

Figure 5:
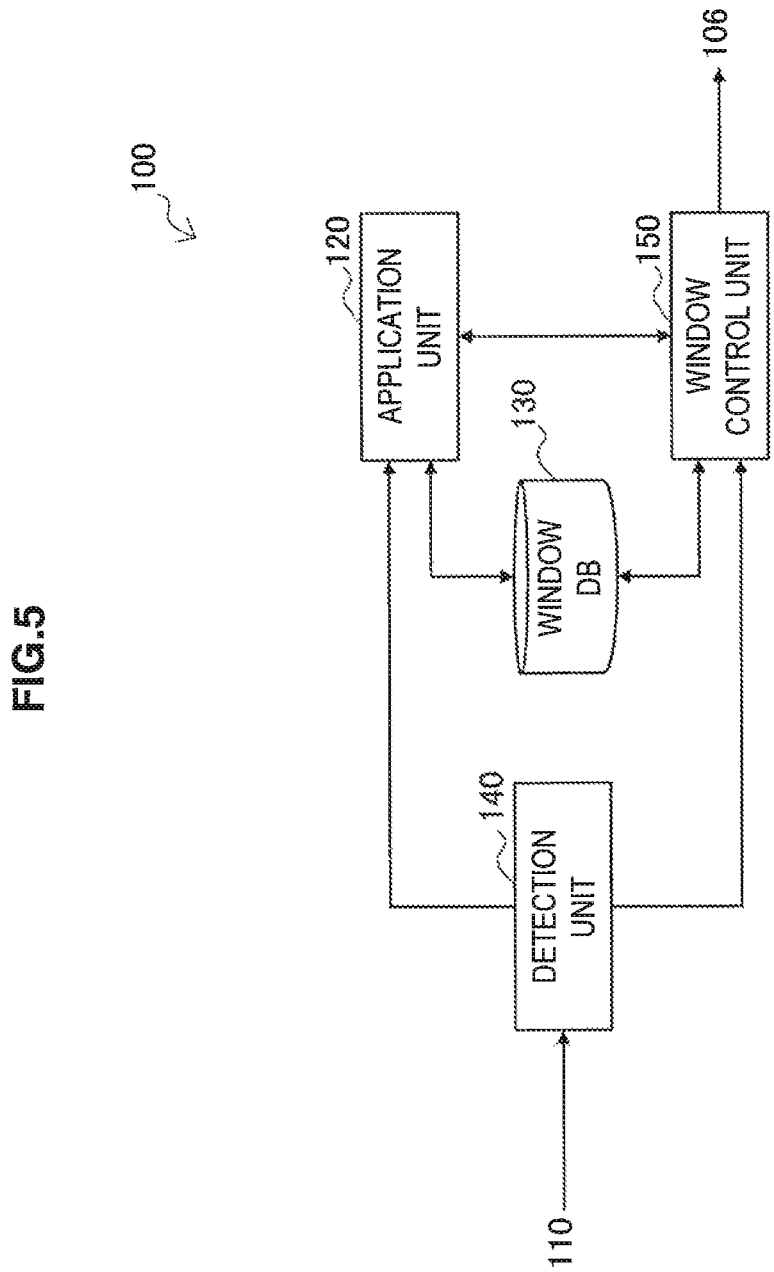
FIG. 5 is a block diagram illustrating an example of a configuration of a logical function of a display control apparatus according to an embodiment.

FIG. 5 is a block diagram illustrating an example of a configuration of a logical function of the display control apparatus 100 according to the present embodiment. Note that, for ease of description, function elements that are not directly associated with the gist of the technology according to the present disclosure are omitted from the diagram. As illustrated in FIG. 5, the display control apparatus 100 includes an application unit 120, a window DB 130, a detection unit 140, and a window control unit 150.

(1) Application Unit The application unit 120 is configured to execute applications. The application unit 120 can execute a plurality of applications in parallel. The applications executed by the application unit 120 may be any type of application. For example, applications such as an Internet browser, a mailer, an SNS client, a content player, a calculator, a remote controller and the like, may be executed by the application unit 120.

When each application is started by the application unit 120, that application generates identification information for identifying itself to the user, and outputs the generated identification information to the window control unit 150. Here, this identification information may be an icon, the name of the application, the name or thumbnail of the content to he handled by that application and the like. Further, each application generates an application image during execution, and outputs the generated application image to the window control unit 150. As is described below, an application window is built by the window control unit 150 using the identification information and the application image.

(2) Window DB

The window DB 130 is a database that stores window data 132 defining the configuration of the application window of each application. In the present embodiment, each application window has, as described above, an identification region. If the window is not displayed as an icon, each application may also have a content region. Several control buttons may also be provided for each application.

Figure 6:
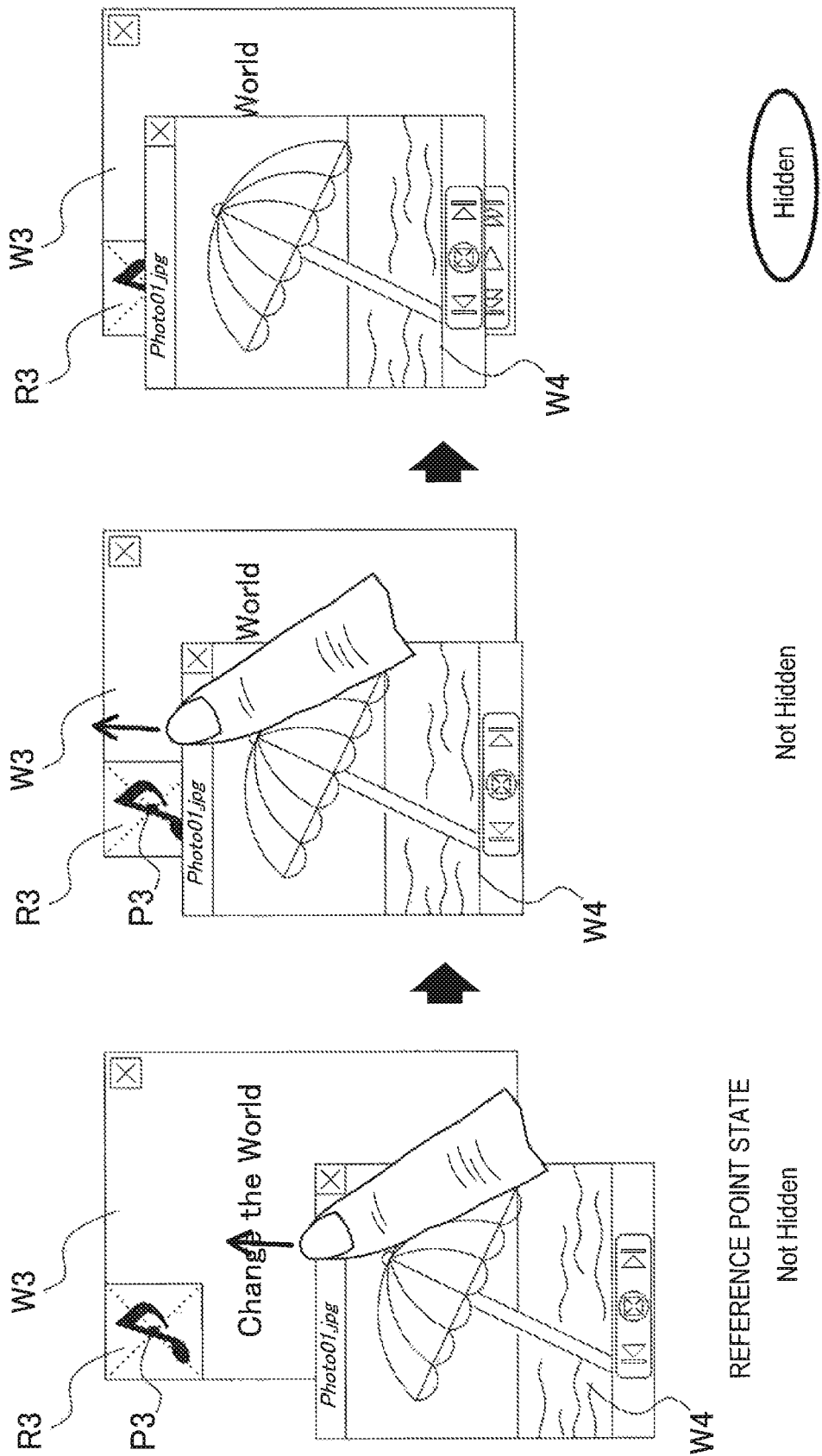
FIG. 6A is an explanatory diagram illustrating a first data example of window data.
FIG. 6B is an explanatory diagram illustrating a second data example of window data.

FIG. 6A is an explanatory diagram illustrating a first data example of the window data 132. As illustrated in FIG. 6A, the window data 132 has seven data items, an "application ID", an "initial position", an "initial size", a "current position", a "current size", a "layout ID", and a "priority level". The application ID is an identifier for uniquely identifying each application. The initial position indicates a display position of the application window in the screen when each application was started (e.g., the coordinates $(X_I, Y_I)$ of the upper left apex of the window in a two-dimensional coordinate system (X,Y) with an origin at the upper left apex of the screen) The initial size indicates the width and the height $(W_I, H_I)$ of the application window when each application was started. The current position indicates a display position $(X_C, Y_C)$ in the screen of the application window that is updated during execution of the application. The current size indicates the width and the height ($W_C, H_C$) of the application window that is updated during execution of the application. The layout ID indicates an identifier for identifying the window layout to be applied for the application window of each application. Various layout IDs may be defined depending on where and how large the identification region to be displayed in each application window is, or what type of identification information the identification region is to display. The priority level is a parameter used to determine which window is to be displayed in front when a plurality of application windows are overlapping. Application windows having a higher priority level are displayed in front of application windows having a lower priority level. The priority level may be, for example, a number in a predetermined range (e.g., 0 to 9).

FIG. 6B is an explanatory diagram illustrating a second data example of the window data 132. As illustrated in FIG. 6B, the window data 132 has eight data items, the "application ID", the "initial position", the "initial size", the "current position", the "current size", an "IR position", an "IR size", and an "IR type". The IR (identification region) position indicates the position of the identification region in the application window (e.g., the coordinates ($U_R, V_R$) of the upper left apex of the identification region in a two-dimensional coordinate system (U,V) with an origin at the upper left apex of the application window). The IR size indicates the width and the height ($W_R, H_R$) of the identification region. The IR type indicates the type (e.g., icon, application name, content name, or thumbnail etc.) of the identification information to be displayed in the identification region.

The window data 132 may be defined by each application. In such a case, each application, for example, notifies the window control unit 150 of a data value (a value of the ID, position, or size etc.) when that application was started. Alternatively, the window data 132 may instead be defined in advance and stored by the window DB 130. Further, the window data 132 may have a data item that is commonly defined for a plurality of applications. Note that a part of the data items of the window data 132 described here may be omitted, or an extra data item may he employed.

(3) Detection Unit

The detection unit 140 is configured to detect a user operation by monitoring an input signal from the I/O controller 110. User operations can be carried out in various ways using the input device 108. When the detection unit 140 detects a user operation for operating an application window, the detection unit 140 notifies the window control unit 150 of an operation event indicating the details (type, operation position, operation direction, operation amount etc.) of the detected user operation. The type of user operation can be differentiated based on the type of touch gesture (e.g., tap, double tap, flick, or drag etc.), or based on the type of button that was pressed. As an example, dragging of the identification region may be interpreted as movement of the window, dragging of a window edge may be interpreted as change in the size of the window, and a double tap of the identification region may be interpreted as movement a switch to the very front, respectively. On the other hand, when the detection unit 140 detects other user operations, the detection unit 140 can notify the application unit 120 of the an operation event.

(4) Window Control Unit

The window control unit 150 builds the application window to be associated with each application based on the window data 132 stored by the window DB 130, and displays the built application windows on the screen. Typically, the window control unit 150 builds application windows that include an identification region displaying identification information, and a content region displaying an application image. The window control unit 150 may acquire from each application data (e.g., the layout ID illustrated in FIG. 6A, or the IR position and IR size illustrated in FIG. 6B) specifying the arrangement of the identification region in the application window. According to this configuration, the level of freedom in the window design of each application is increased. Alternatively, the arrangement of the identification region in the application window may instead be commonly defined in advance across a plurality of applications in the window DB 130. According to this configuration, the window design of each application is simple, which allows the development costs of the application to be suppressed.

When a plurality of applications are executed by the application unit 120, the window control unit 150 displays a plurality of application windows on the screen. When the plurality of application windows are displayed, the window control unit 150 may arrange the application windows having a higher priority level that is given to each window in front (in the depth direction). Further, the window control unit 150 controls the display of each application window based on the user operation detected by the detection unit 140. For example, in the present embodiment, the window control unit 150 determines whether a first application associated with a first application window is difficult to identify due to at least a portion of the first application window being hidden by a second application window.

If the window control unit 150 determines that the first application is difficult to identify, the window control unit 150 controls the display of each application window so that the identification information for identifying the first application is visible to the user.

Typically, the window control unit 150 determines the identifiability of the applications each time the position, the size, or a ranking in the depth direction of any of the applications changes. For example, the window control unit 150 can determine the identifiability of the first application based on a positional relationship between the identification region of the first application window and a second application window. In a first method, the window control unit 150 may determine that the first application is difficult to identify if a reference point in the identification region of the first application window is hidden by the second application window. Alternatively, in a second method, the window control unit 150 may determine that the first application is difficult to identify if a predetermined ratio of the identification region of the first application window is hidden by the second application window.

Figure 7:
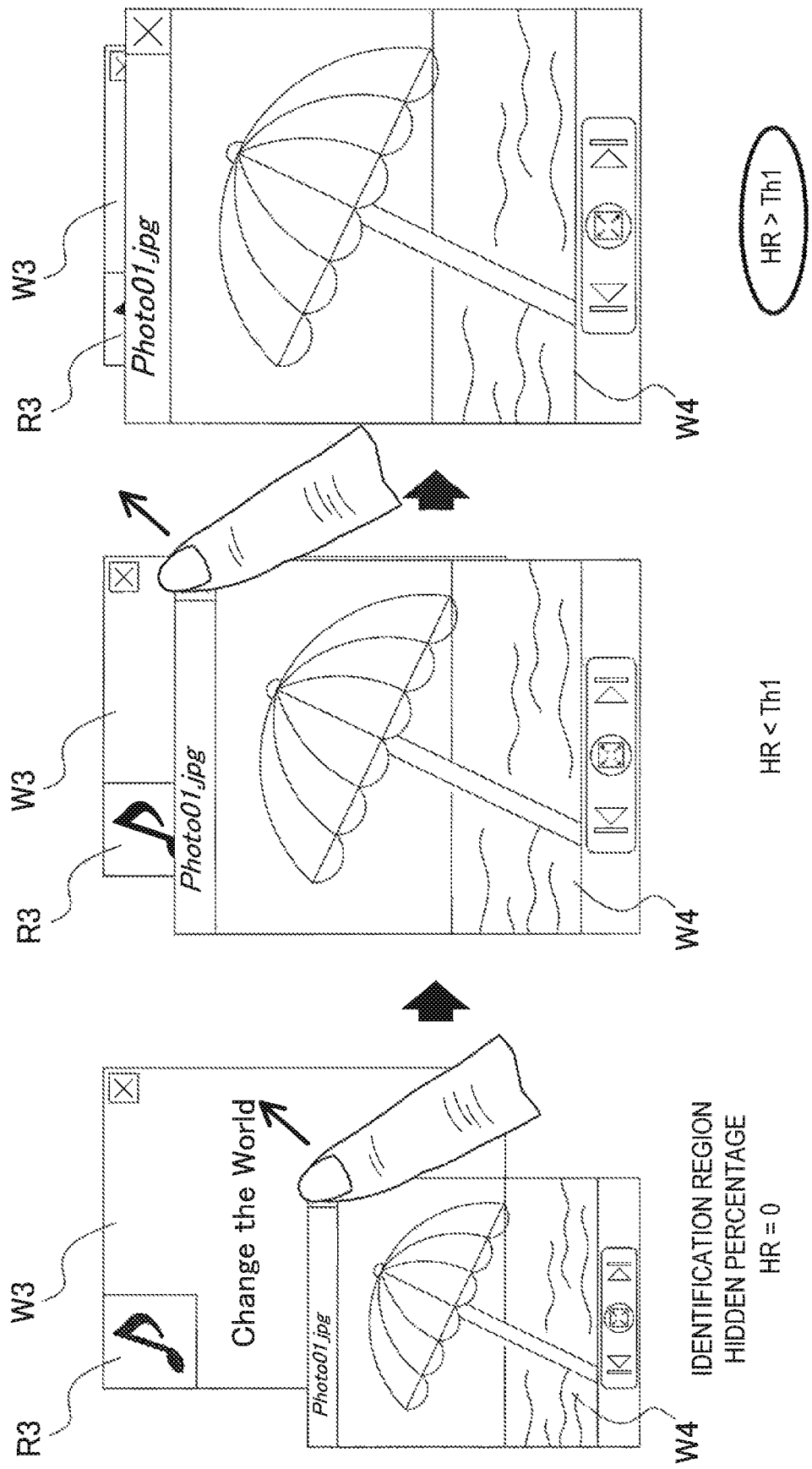
FIG. 7A is an explanatory diagram illustrating a first method for determining identifiability of an application.
FIG. 7B is an explanatory diagram illustrating a second method for determining identifiability of an application.

FIG. 7A is an explanatory diagram illustrating the first method for determining the identifiability of an application. As illustrated in FIG. 7A, two application windows W3 and W4 are illustrated. The application window W3 is a window associated with a music playback application, and the application window W4 is a window associated with an image playback application. An identification region R3 of the application window W3 illustrates a music playback application icon. A point P3 is a reference point positioned in the center of the identification region R3. The application window W4 is positioned in front of the application window W3. On the left of FIG. 7A, although the application window W3 and the application window W4 are overlapping, the identification region R3 of the application window W3 is not hidden by the application window W4. Subsequently, the application window W3 is moved in an upward direction based on a user operation. In the center of FIG. 7A, although the application window W4 overlaps the identification region R3 of the application window W3, a reference point P3 of the identification region R3 is not hidden by the application window W4. If the user operation continues so that the state reaches the state illustrated on the right of FIG. 7A, the application window W4 hides the reference point P3 of the identification region R3 of the application window WI In such a state, the window control unit 150 can determine that it has become difficult for the user to identify the application associated with the application window WI According to the first method, since the determination can be carried out just by checking whether or not the reference point is included in the rectangular window, the identifiability determination can be easily implemented. Note that the reference point may be positioned at another location instead of the center of the identification region, such as at any of the apexes or on any of the sides of the identification region. Further, the position of the reference point may be determined based on the window data 132. In addition, a plurality of reference points may be present in one identification region.

FIG. 7B is an explanatory diagram illustrating the second method for determining the identifiability of an application. As illustrated in FIG. 7B, two application windows W3 and W4 are again illustrated. The application window W4 is positioned in front of the application window WI On the left of FIG. 7B, although the application window W3 and the application window W4 are overlapping, the identification region R3 of the application window W3 is not hidden by the application window W4. Subsequently, the application window W3 is increased in size in the upper right direction based on a user operation. In the center of FIG. 7B, the application window W4 overlaps the identification region R3 of the application window W3. However, the ratio of the area of the hidden portion based on the total area of the identification region R3 (hereinafter referred to as "hidden percentage") is smaller than a predetermined threshold Th1 (e.g., Th1=0.5). Further, if the user operation continues so that the state reaches the state illustrated on the right of FIG. 7B, the application window W4 hides a larger area of the identification region R3 of the application window W3. A hidden percentage HR of the identification region R3 is greater than the threshold Th1. In such a state, the window control unit 150 can determine that it has become difficult for the user to identify the application associated with the application window W3. According to the second method, the determination of identifiability of the application can be carried out without defining a reference point. Note that the above-described Th1 may be defined for each application, or may he commonly defined across a plurality of applications. Further, a threshold may be used that depends on the type of identification information.

The window control unit 150 adjusts the display of the application window based on the result of such a determination of identifiability. A display attribute of each application window adjusted by the window control unit 150 includes at least one among the display position, the window size, an icon display state, a window layout, and a transparency level. In the following section, several scenarios of control by the window control unit 150 are specifically described.

2-3 Window Control Scenarios (1) First Scenario

In a first scenario, if the window control unit 150 determines that the first application is difficult to identify, the window control unit 150 moves the first application window so that the identification region of the first application window is visible to the user. The window control unit 150 determines the direction of movement of the first application window based on the operation direction of the second application window hiding the identification region of the first application window. The movement amount of the first application window may also be determined based on the operation amount of the second application window.

Figure 8:
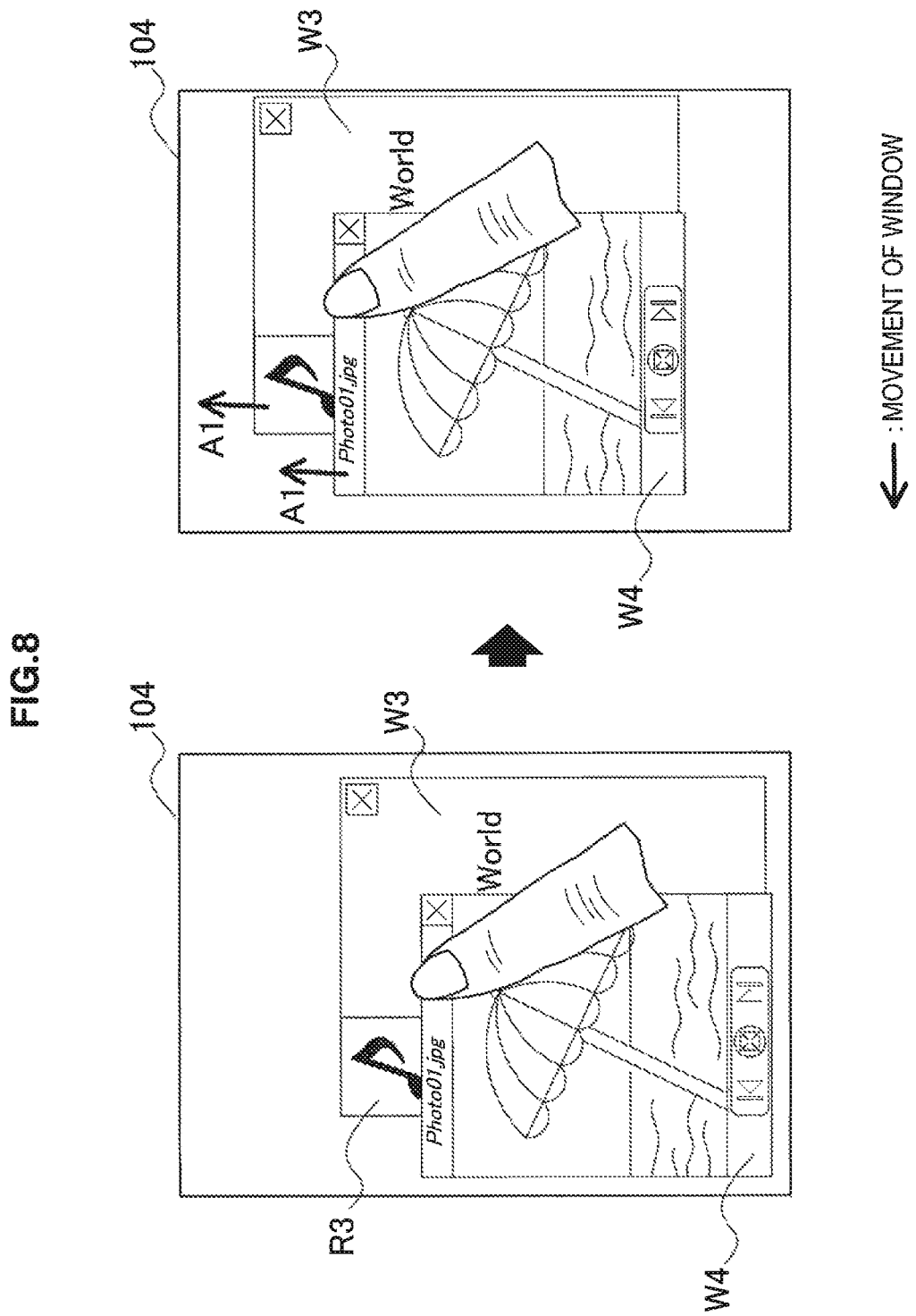
FIG. 8 is an explanatory diagram illustrating a first scenario of window control.

FIG. 8 is an explanatory diagram illustrating the first scenario of window control. As illustrated on the left of FIG. 8, two application windows W3 and W4 are displayed on the display 104. The application window W4 is positioned in front of the application window W3. In the first scenario, the user drags and moves the application window W4 in an upward direction. If it is determined by the window control unit 150 that as a result of moving the application window W4 the application associated with the application window W3 is difficult to identify, in addition to the application window W4, the window control unit 150 also moves the application window W3 in an upward direction (arrow A1 on the right of FIG. 8). Consequently, the identification region R3 of the application window W3 maintains a position that is visible to the user.

(2) Second Scenario

In a second scenario as well, if the window control unit 150 determines that the first application is difficult to identify; the window control unit 150 moves the first application window so that the identification region of the first application window is visible to the user. The window control unit 150 determines the direction of movement of the first application window based on the operation direction of the second application window hiding the identification region of the first application window.

Figure 9:
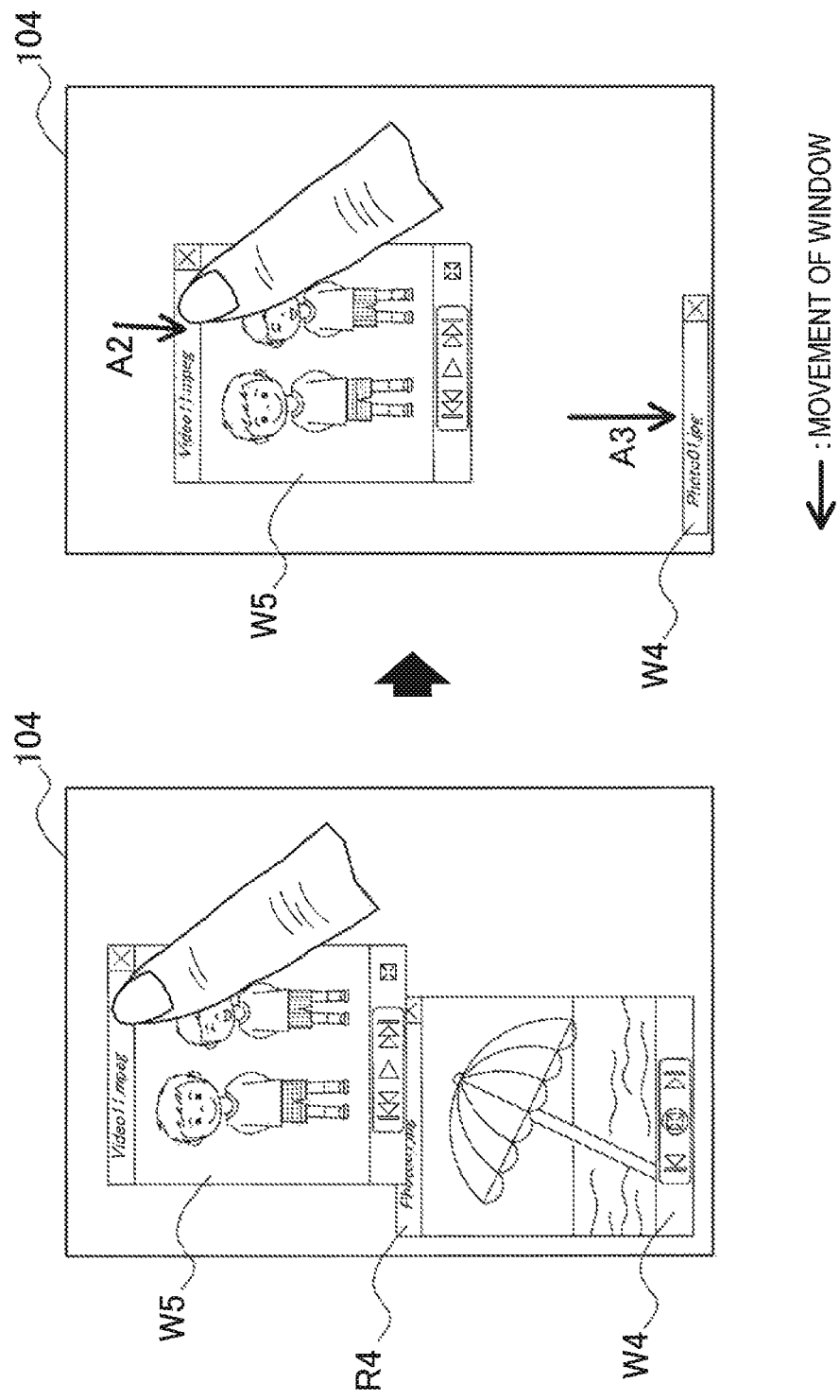
FIG. 9 is an explanatory diagram illustrating a second scenario of window control.

FIG. 9 is an explanatory diagram illustrating the second scenario of window control. As illustrated on the left of FIG. 9, two application windows W4 and W5 are displayed on the display 104. The application window W5 is positioned in front of the application window W4. In the second scenario, the user drags and moves the application window W5 in a downward direction. If it is determined by the window control unit 150 that as a result of moving the application window W5 the application associated with the application window W4 is difficult to identify, the window control unit 150 moves the application window W4 in a downward direction. However, in the second scenario, although the movement amount of the application window W5 corresponds to the operation amount (arrow A2 on the right of FIG. 9), the application window W4 is moved so that content region of the application window W4 moves off the screen while the identification region R4 of the application window W4 remains on the screen (arrow A3 on the right of FIG. 9). Consequently, while the identification region R4 of the application window W4 is maintained in a visible state, the obstructing window is moved away from the vicinity of the application window W5 that the user is paying attention to.

(3) Third Scenario

In a third scenario, if the window control unit 150 determines that the first application is difficult to identify, the window control unit 150 changes the size of the first application window so that the identification region of the first application window is visible to the user. The window control unit 150 determines the direction of the change in size of the first application window based on the operation direction of the second application window hiding the identification region of the first application window. The amount of change in size of the first application window may also be determined based on the operation amount of the second application window.

Figure 10:
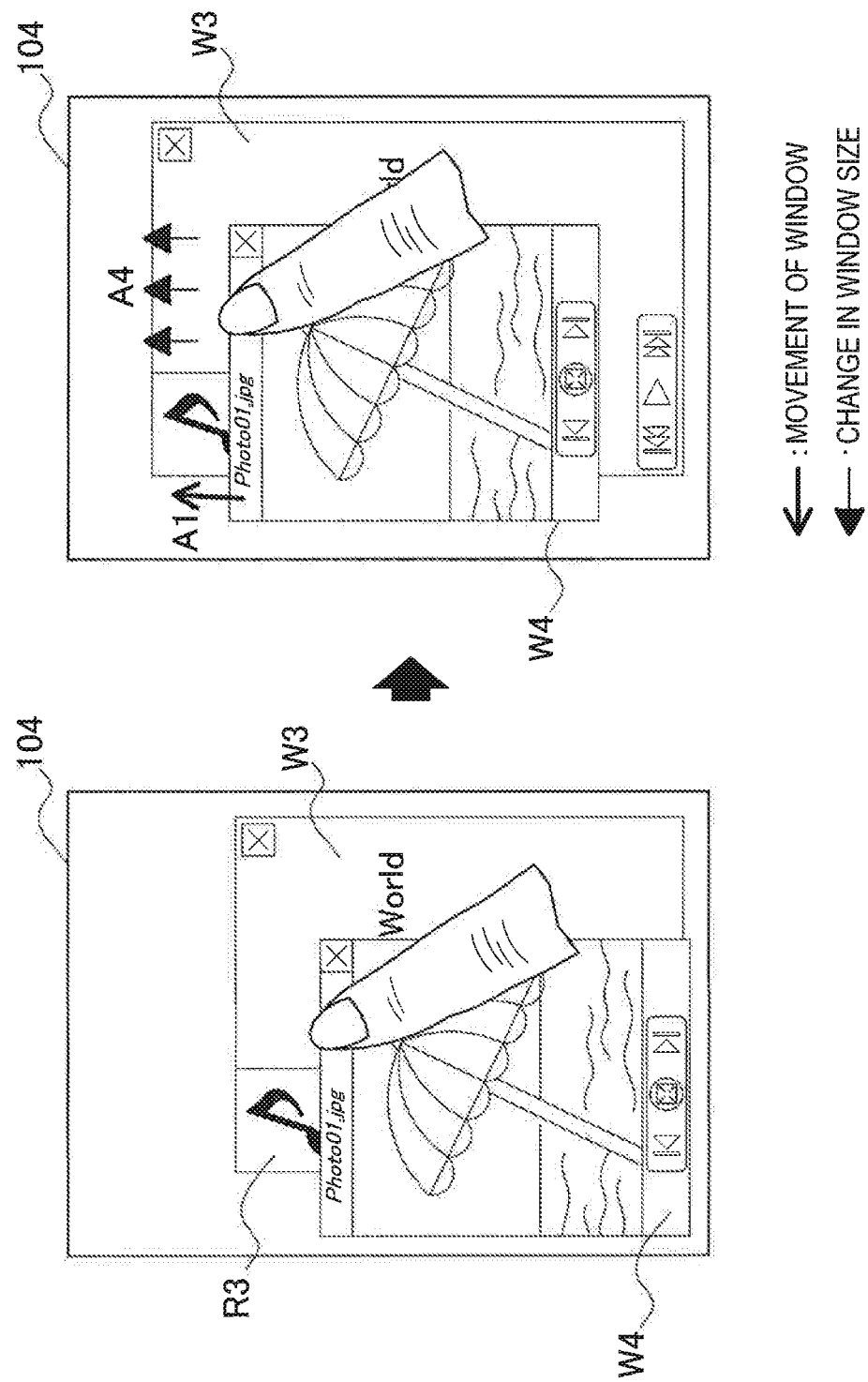
FIG. 10 is an explanatory diagram illustrating a third scenario of window control.

FIG. 10 is an explanatory diagram illustrating the third scenario of window control. As illustrated on the left of FIG. 10, two application windows W3 and W4 are displayed on the display 104. The application window W4 is positioned in front of the application window WI In the third scenario, the user drags and moves the application window W4 in an upward direction. If it is determined by the window control unit 150 that as a result of moving the application window W4 the application associated with the application window W3 is difficult to identify, the window control unit 150 lengthens the height of the application window W3 in an upward direction (arrow A4 on the right of FIG. 10). Consequently, the identification region R3 of the application window W3 maintains a position that is visible to the user.

(4) Fourth Scenario

In a fourth scenario as well, if the window control unit 150 determines that the first application is difficult to identify, the window control unit 150 changes the size of the first application window so that the identification region of the first application window is visible to the user. The window control unit 150 determines the direction of the change in size of the first application window based on the operation direction of the second application window hiding the identification region of the first application window. The amount of change in size of the first application window may also be determined based on the operation amount of the second application window.

Figure 11:
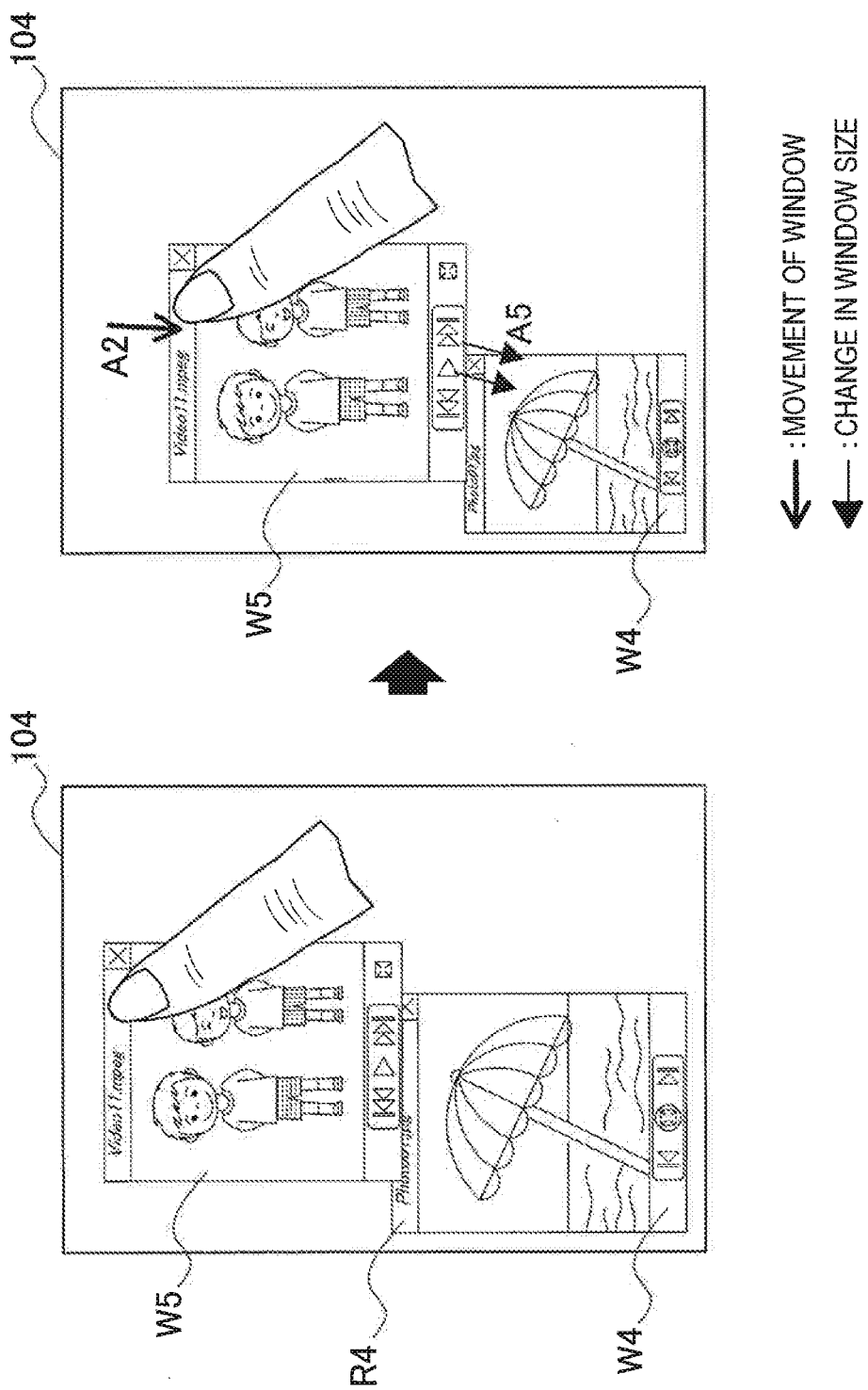
FIG. 11 is an explanatory diagram illustrating a fourth scenario of window control.

FIG. 11 is an explanatory diagram illustrating the fourth scenario of window control. As illustrated on the left of FIG. 11, two application windows W4 and W5 are displayed on the display 104. The application window W5 is positioned in front of the application window W4. In the fourth scenario, the user drags and moves the application window W5 in a downward direction. If it is determined by the window control unit 150 that as a result of moving the application window W5 the application associated with the application window W4 is difficult to identify, the window control unit 150 shortens the height and width of the application window W4 in a left-downward direction (arrow A5 on the right of FIG. 11). Consequently, the identification region R4 of the application window W4 maintains a position that is visible to the user.

(5) Fifth Scenario

In a fifth scenario, if the window control unit 150 determines that the first application is difficult to identify, the window control unit 150 displays an icon of the first application window, and displays the icon of the first application window at a position that is not hidden by the second application window. This icon has a role as identification information for identifying the first application. The display of the icon may be handled as a kind of change in the window layout.

Figure 12:
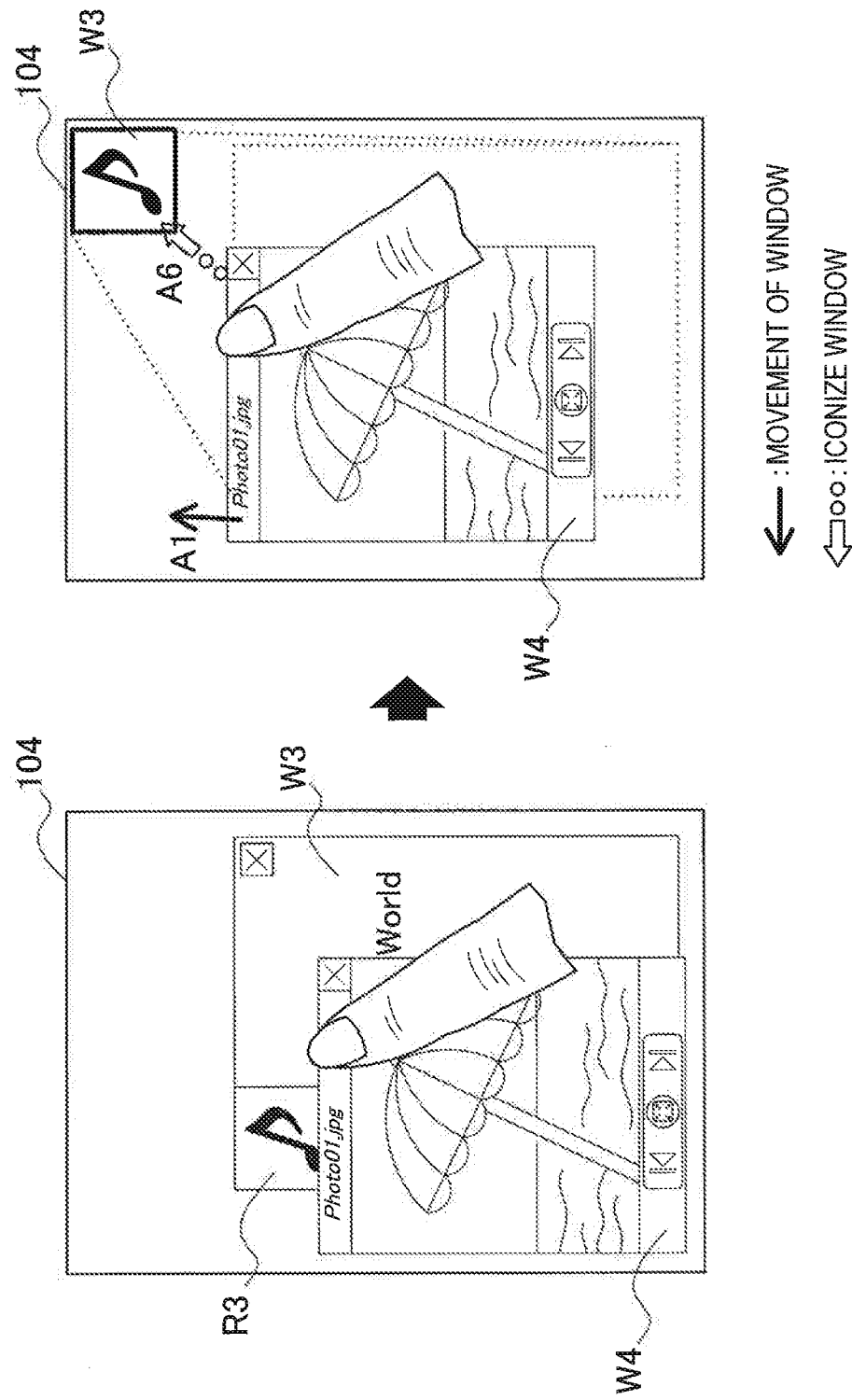
FIG. 12 is an explanatory diagram illustrating a fifth scenario of window control.

FIG. 12 is an explanatory diagram illustrating the fifth scenario of window control. As illustrated on the left of FIG. 12, two application windows W3 and W4 are displayed on the display 104. The application window W4 is positioned in front of the application window W3. In the fifth scenario, the user drags and moves the application window W4 in an upward direction. If it is determined by the window control unit 150 that as a result of moving the application window W4 the application associated with the application window W3 is difficult to identify, the window control unit 150 displays an icon of the application window W3 (arrow A6 on the right of FIG. 12). Consequently, the identification region R3 (here, the icon) of the application window W3 maintains a position that is visible to the user.

(6) Sixth Scenario

In a sixth scenario, if the window control unit 150 determines that the first application is difficult to identify, the window control unit 150 changes the layout of the first application window so that the identification region of the first application window moves to a position that is not hidden by the second application window.

Figure 13:
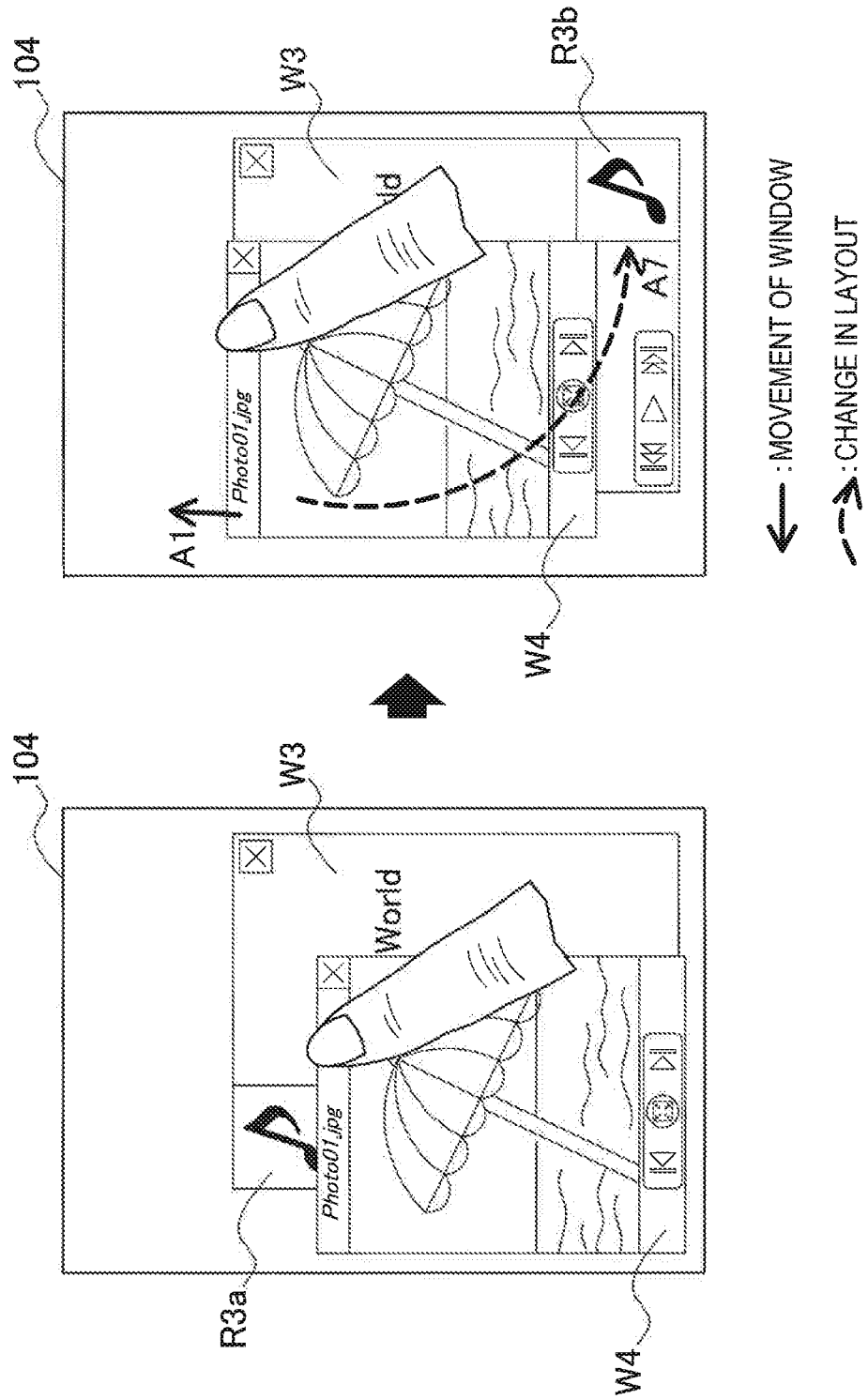
FIG. 13 is an explanatory diagram illustrating a sixth scenario of window control.

FIG. 13 is an explanatory diagram illustrating the sixth scenario of window control. As illustrated on the left of FIG. 13, two application windows W3 and W4 are displayed on the display 104. The application window W4 is positioned in front of the application window W3. An identification region R3a of the application window W3 is arranged at the upper left corner of the window. In the sixth scenario, the user drags and moves the application window W4 in an upward direction. If it is determined by the window control unit 150 that as a result of moving the application window W4 the application associated with the application window W3 is difficult to identify, the window control unit 150 changes the window layout of the application window W3, and replaces the identification region R3a at the upper left corner with an identification region R3b at the lower right corner (arrow A7 on the right of FIG. 13). Consequently, the identification region R3b of the application window W3 is visible after the user operation.

(7) Seventh Scenario

In a seventh scenario, if the window control unit 150 determines that the first application is difficult to identify, the window control unit 150 changes the layout of the first application window so that the identification region of the first application window moves to a position that is not hidden by the second application window. Further, the window control unit 150 displays second identification information different from first identification information displayed on the identification region before processing corresponding to layout change on the identification region after that processing.

Figure 14:
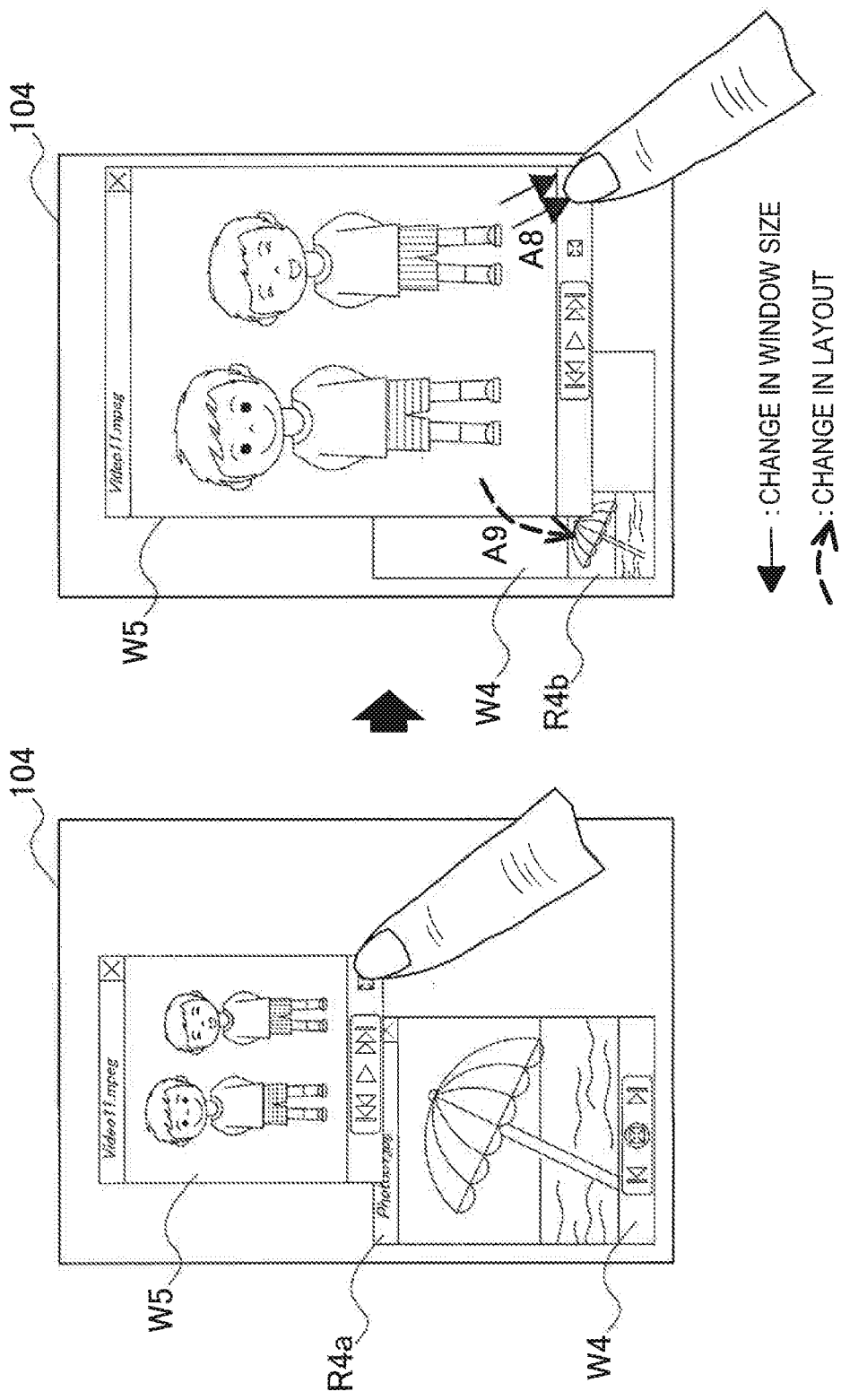
FIG. 14 is an explanatory diagram illustrating a seventh scenario of window control.

FIG. 14 is an explanatory diagram illustrating the seventh scenario of window control. As illustrated on the left of FIG. 14, two application windows W4 and W5 are displayed on the display 104. The application window W5 is positioned in front of the application window W5. An identification region R4a of the application window W4 is arranged along an upper side of the application window W4. In the seventh scenario, the user enlarges the size of the application window W5 by dragging an edge of the application window W5 (arrow A1 on the right of FIG. 14). If it is determined by the window control unit 150 that as a result of enlargement the application associated with the application window W4 is difficult to identify, the window control unit 150 changes the window layout of the application window W4, and replaces the identification region R4a with an identification region R4b at the lower left corner (arrow A9 on the right of FIG. 14).

Further, the window control unit 150 also changes the identification information indicated by the identification region in order to change the shape of the identification region during the layout change. In the example illustrated in FIG. 14, name (file name) of the content that is the identification information in the identification region R4a is changed to the thumbnail of the content in the identification region R4b after the layout change. Consequently, even after the user operation, the user can easily identify which application the application window W4 is for.

Note that the window control unit 150 is not limited to layout change, the window control unit 150 may also move the windows, change the size, or change the identification information before or after displaying the icon. Further, even in the case of changing the size instead of the shape of the identification region, the window control unit 150 may also change the identification information based on that change in size.

(8) Eighth Scenario

In an eighth scenario as well, if the window control unit 150 determines that the first application is difficult to identify, the window control unit 150 changes the layout of the first application window so that the identification region of the first application window moves to a position that is not hidden by the second application window.

Figure 15:
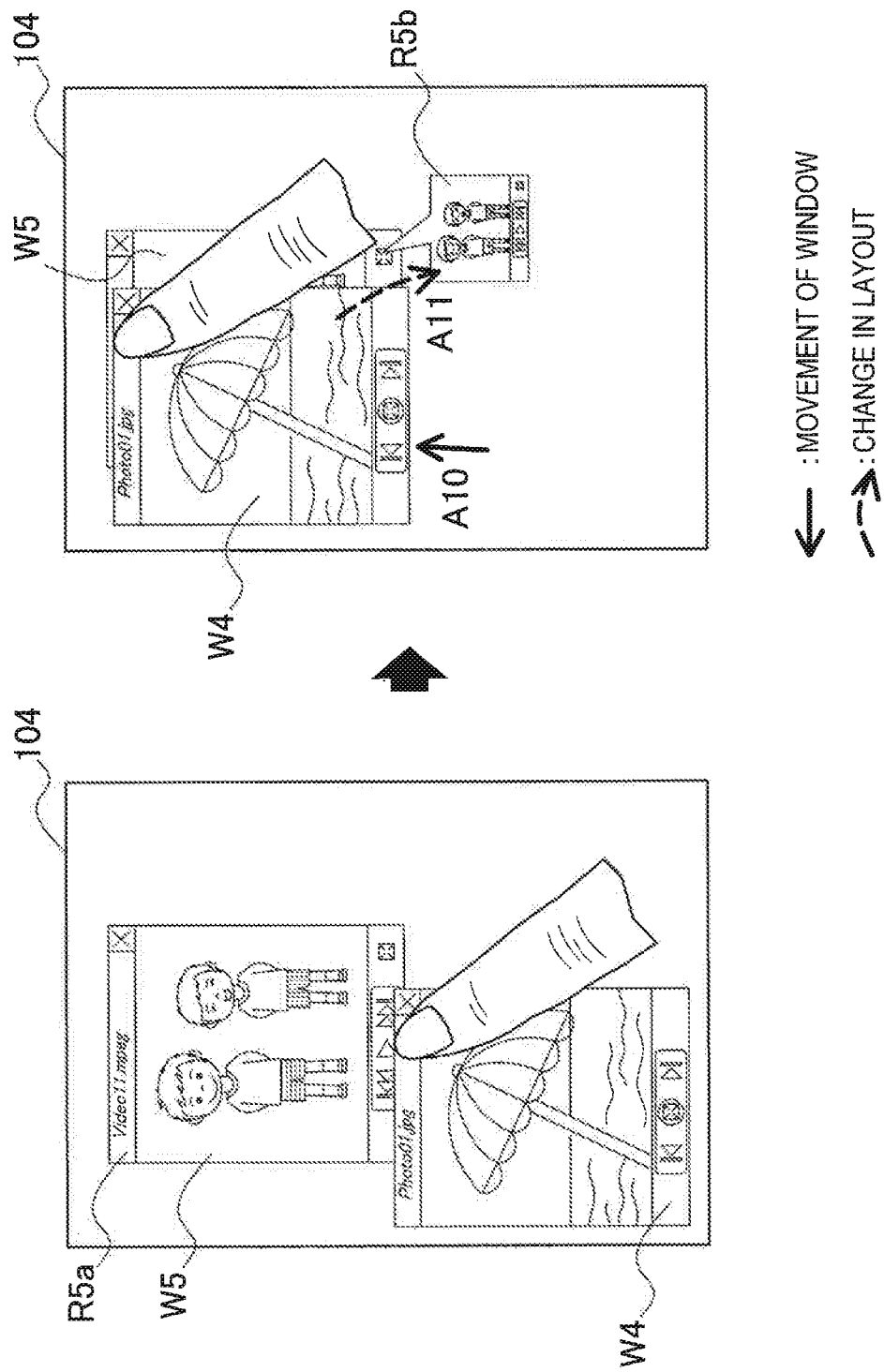
FIG. 15 is an explanatory diagram illustrating an eighth scenario of window control.

FIG. 15 is an explanatory diagram illustrating the eighth scenario of window control. As illustrated on the left of FIG. 15, two application windows W4 and W5 are displayed on the display 104. The application window W4 is positioned in front of the application window W5. An identification region R5a of the application window W4 is positioned along an upper side of the window. In the eighth scenario, the user drags and moves the application window W4 in an upward direction (arrow A10 on the right of FIG. 15). If it is determined by the window control unit 150 that as a result of the movement the application associated with the application window W5 is difficult to identify, the window control unit 150 changes the window layout of the application window W5, deletes the identification region R5a, and displays a new identification region R5b below the application window W5 (arrow A11 on the right of FIG. 15). The new identification region R5b indicates a thumbnail of the content in the form of a balloon. Consequently, even after the user operation, the user can easily identify which application the application window W5 is for.

(9) Ninth Scenario

In a ninth scenario, if the window control unit 150 determines that the first application is difficult to identify, the window control unit 150 makes at least a portion of the second application window overlapping the identification region of the first application window transparent.

Figure 16:
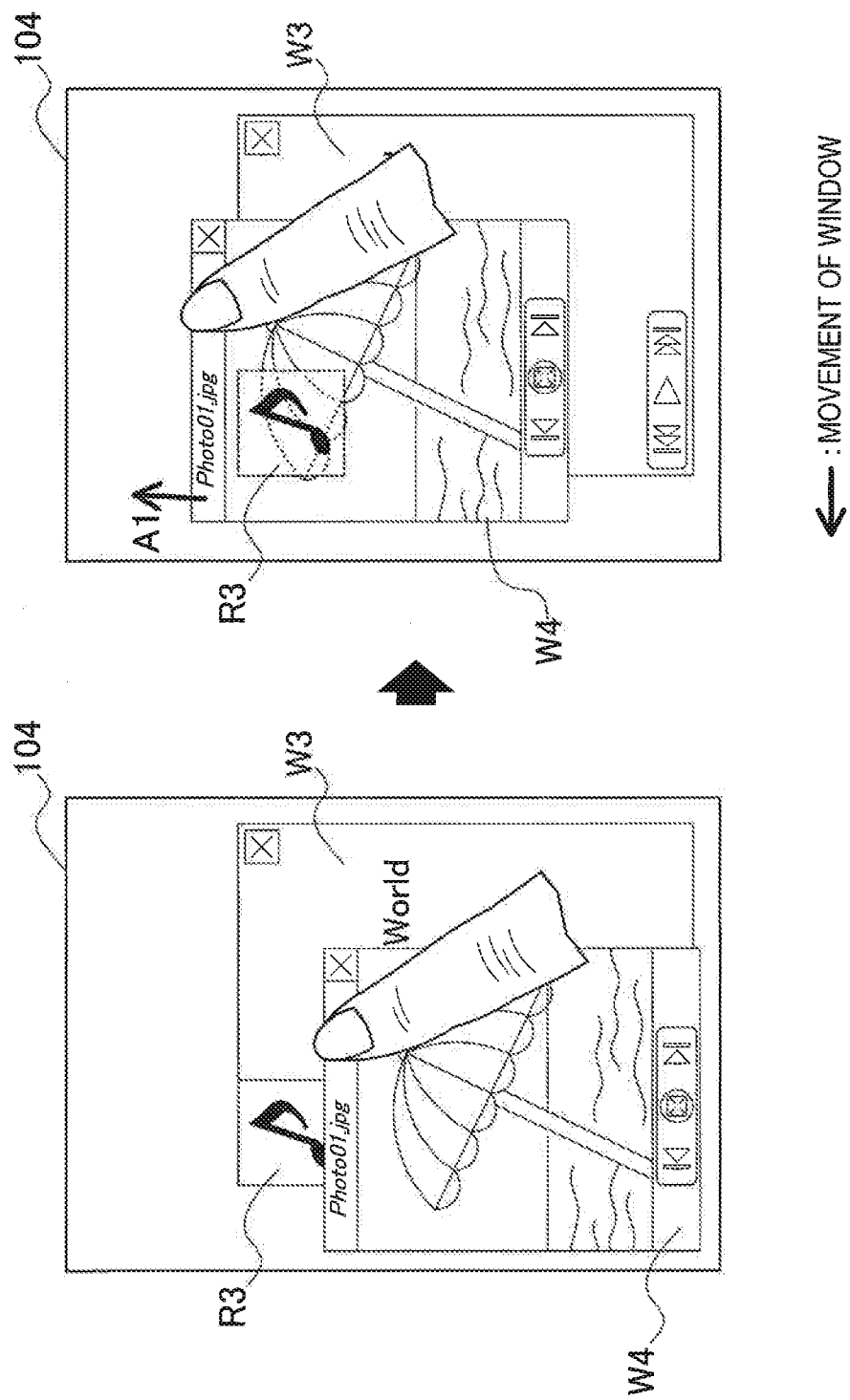
FIG. 16 is an explanatory diagram illustrating a ninth scenario of window control.

FIG. 16 is an explanatory diagram illustrating the ninth scenario of window control. As illustrated on the left of FIG. 16, two application windows W3 and W4 are displayed on the display 104. The application window W4 is positioned in front of the application window W3. In the ninth scenario, the user drags and moves the application window W4 in an upward direction. If it is determined by the window control unit 150 that as a result of moving the application window W4 the application associated with the application window W3 is difficult to identify, the window control unit 150 makes at least a portion of the application window W4 overlapping the identification region R3 of the application window W3 transparent (the right of FIG. 16). Consequently, the identification region R3 of the application window W3 maintains a position that is visible to the user. Note that the window control unit 150 may also make the application window W4 transparent in the vicinity of the operation position of the application window W4 operated on by the user so that the user operation is not obstructed.

(10) Tenth Scenario

In a tenth scenario, the window control unit 150 limits operation of the second application window so that the second application window is not arranged at a position where it is difficult to identify the first application window.

Figure 17:
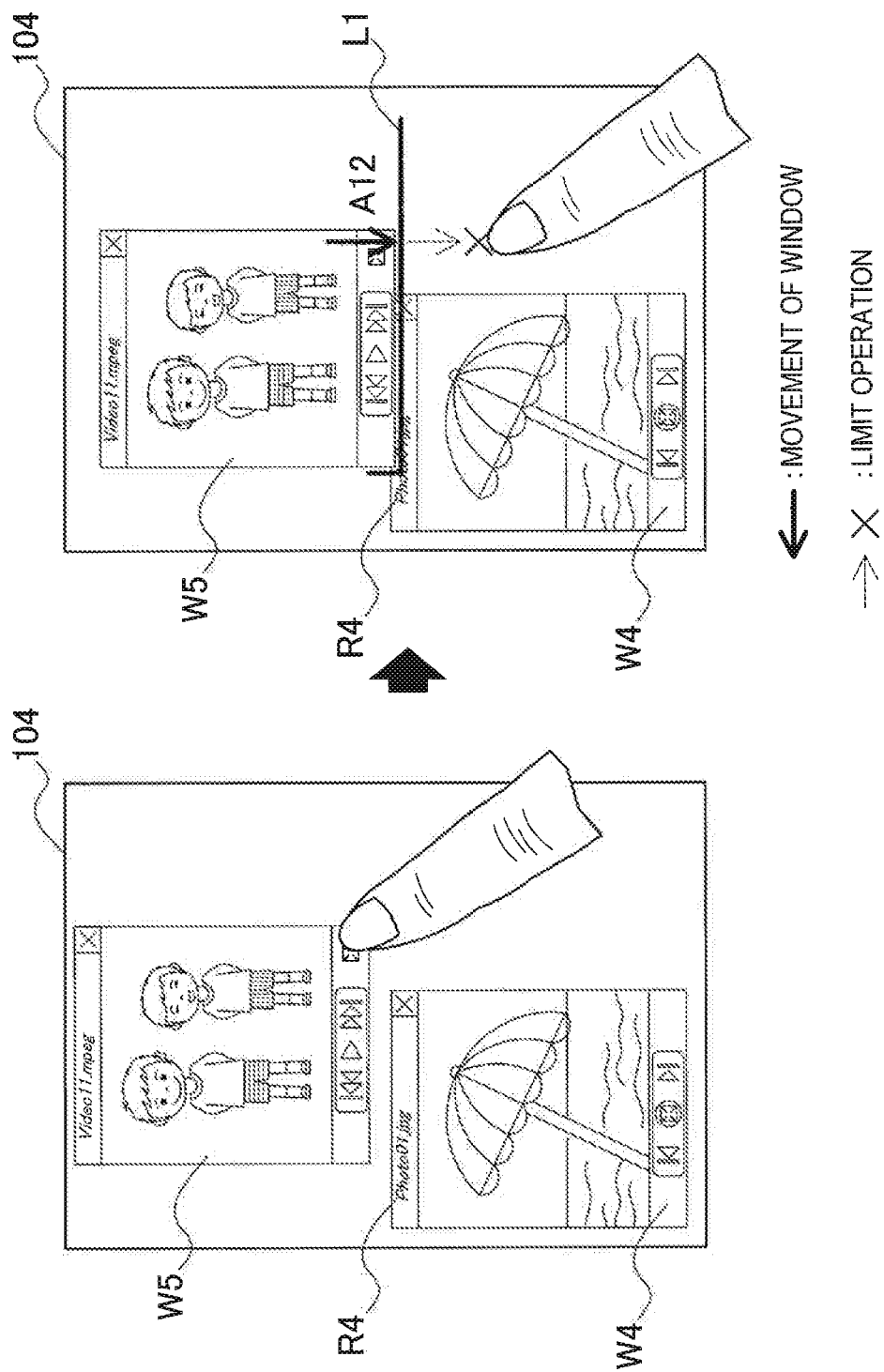
FIG. 17 is an explanatory diagram illustrating a tenth scenario of window control.

FIG. 17 is an explanatory diagram illustrating the tenth scenario of window control. As illustrated on the left of FIG. 17, two application windows W4 and W5 are displayed on the display 104. The identification region R4 of the application window W4 is arranged along an upper side of the window. In the tenth scenario, the user drags and moves the application window W5 in a downward direction (arrow A12 on the right of FIG. 17). If it is determined by the window control unit 150 that when the application window W5 is moved based on the operation amount of the user operation the application associated with the application window W4 is difficult to identify, the window control unit 150 limits the movement of the application window W5 (line L1 on the right of FIG. 17). Consequently, the identification region R4 of the application window W4 maintains a position that is visible to the user.

(11) Eleventh Scenario

In most of the cases described above, the application window operated on by the user hides another application window. However, the technology according to the present disclosure can be similarly applied even in cases in which the application window to be operated on by the user is hidden behind another application window. The determination regarding which window is hidden by which other window depends on the priority level given to each application window. The priority level may be given based on the operated order (a higher priority level given to the window operated on later etc.), or the priority level may be given based on some other condition, such as a usage frequency of each application or a system setting.

In an eleventh scenario, if a predetermined user operation on the first application window arranged behind the second application window is detected by the detection unit 140, the window control unit 150 arranges the first application window in front of the second application window regardless of the priority levels before the detection.

Figure 18:
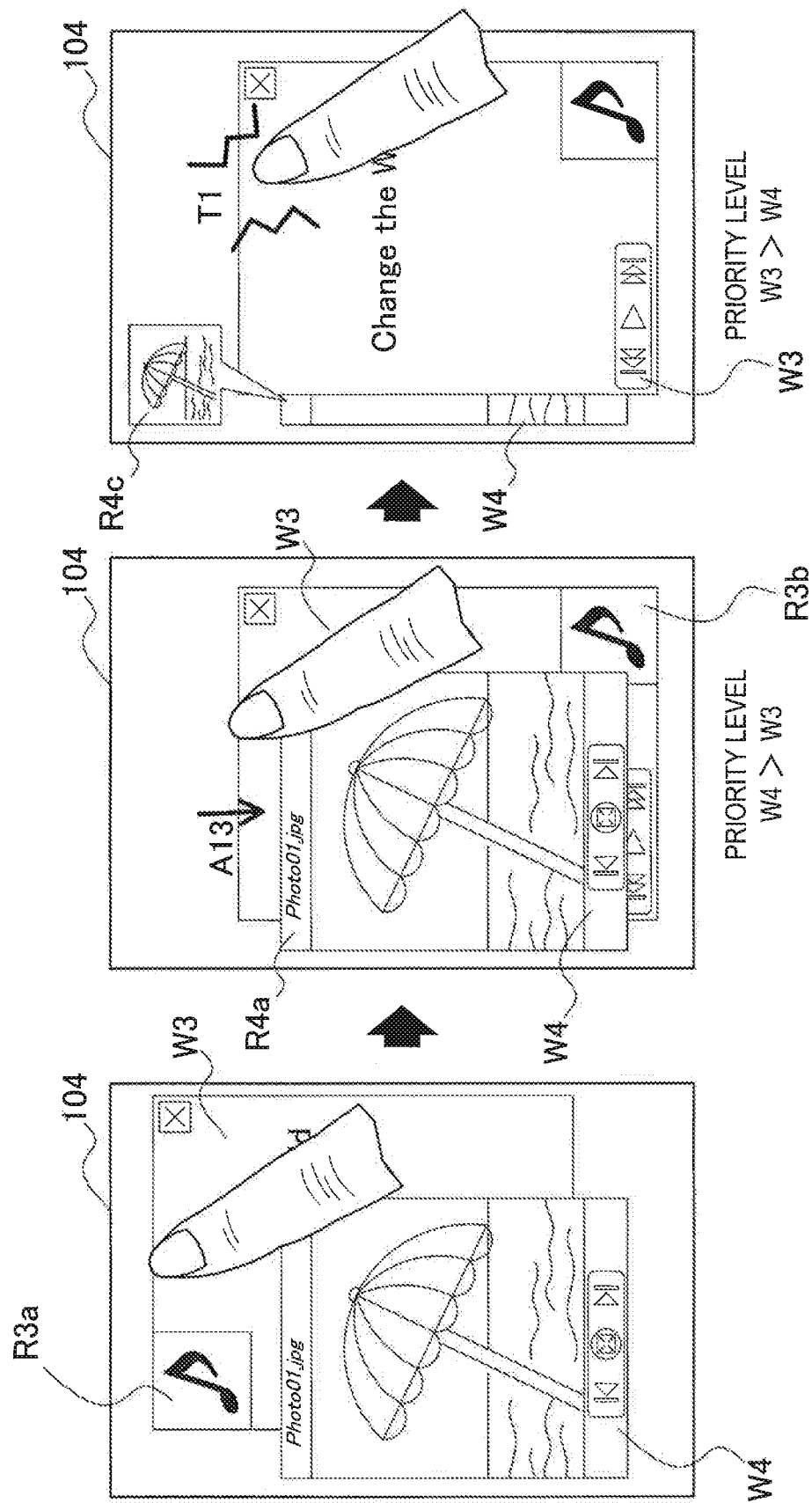
FIG. 18 is an explanatory diagram illustrating a eleventh scenario of window control.

FIG. 18 is an explanatory diagram illustrating the eleventh scenario of window control. As illustrated on the left of FIG. 18, two application windows W3 and W4 are displayed on the display 104. The priority level of the application window W4 is higher than the priority level of the application window W3, so the application window W4 is positioned in front of the application window W3. The identification region R3a of the application window W3 is arranged at the upper left corner of the window. In the eleventh scenario, the user drags and moves the application window W3 in a downward direction (arrow A13 on the center of FIG. 18). Here, the priority level based on this operation is not changed. If it is determined by the window control unit 150 that as a result of moving the application window W3 the application associated with the application window W3 is difficult to identify the window control unit 150 changes the window layout of the application window W3, and replaces the identification region R3a at the upper left corner with an identification region R3b at the lower right corner. For example, when the user double taps the application window W3 (reference symbol T1 on the right of FIG. 18), the window control unit 150 updates the priority level of the application window W3 to a higher value than the priority level of the application window W4, and moves the application window W3 in front of the application window W4. If it is determined by the window control unit 150 that as a result of moving the application window W3 in front the application associated with the application window W4 is difficult to identify, the window control unit 150 changes the window layout of the application window W4, and replaces the identification region R4a of the application window W4 with an identification region R4c in the form of a balloon. Through this series of operations, the identification regions of the application windows W3 and W4 are maintained in a state visible to the user.

In the various scenarios described in this section, instead of abruptly changing a display attribute of the application window, the window control unit 150 may display an animation that appears as if the display attribute is smoothly (continuously) changing. This can prevent the user from missing the correspondence between the application windows (or identification regions) before and after the change.

3. Example of Processing Flow

Figure 19:
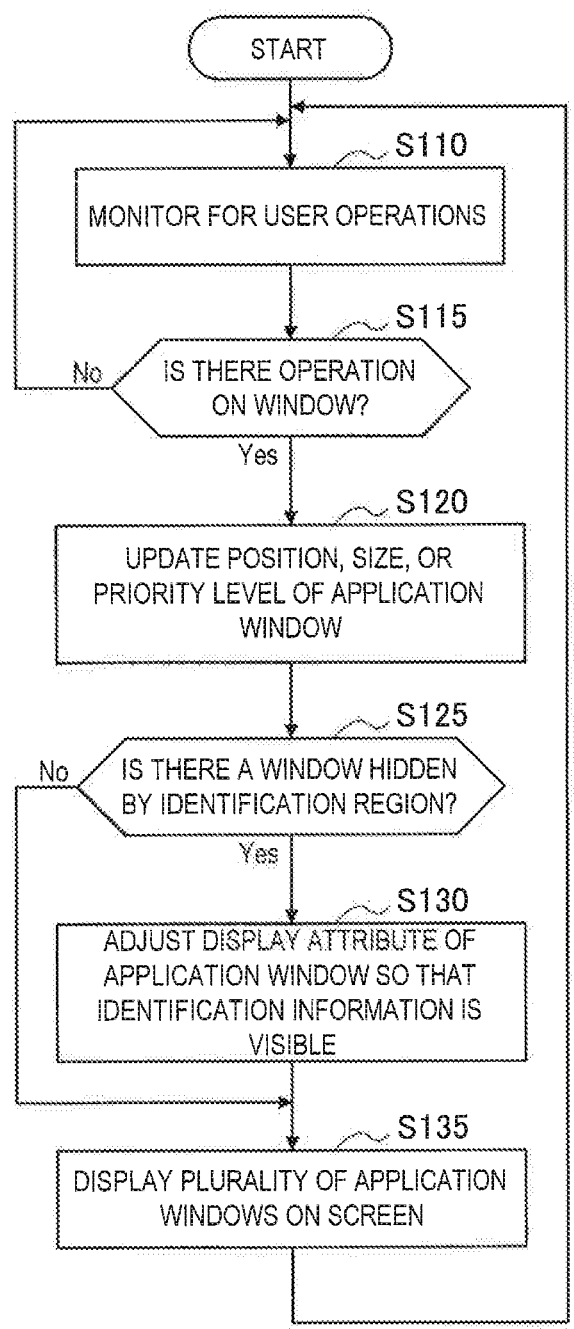
FIG. 19 is a flowchart illustrating an example of a flow of processing executed in an embodiment.

FIG. 19 is a flowchart illustrating an example of a flow of processing executed by the display control apparatus 100 in the present embodiment. Note that at the point when the flowchart starts, a plurality of applications are already being executed by the application unit 120.

As illustrated in FIG. 19, first, the detection unit 140 continuously monitors for user operations (Step S110). Then, when a user operation on an application window is detected by the detection unit 140, the processing proceeds to Step S120 (Step S115).

The window control unit 150 updates at least one of the current position, the current size, and the priority level of the operation target application window based on the user operation detected by the detection unit 140 (Step S120). Next, the window control unit 150 determines whether among a plurality of application windows to be displayed there is an application window whose identification region is hidden (Step S125). if it is determined that there is an application window whose identification region is hidden, the window control unit 150 adjusts a display attribute of the application window so that the identification region is visible (Step S130). This adjustment of the display attribute can be carried out based on, for example, one or a plurality of the first to eleventh scenarios described above.

Then, the window control unit 150 builds each of the plurality of application windows based on the display attribute updated in Step S120 or adjusted in Step S130, and displays the application windows on the screen (Step S135). Then, the processing returns to Step S110.

4. Conclusion

An embodiment of the technology according to the present disclosure has been described above with reference to FIGS. 1 to 19. According to the above-described embodiment, in a state in which a plurality of application windows are overlapping on the screen, identification information about each application can be maintained in a visible state so that none of the applications is difficult for the user to identify. Therefore, even when a taskbar is not displayed, the user can appropriately grasp the plurality of application windows.

Further, according to the above-described embodiment, the identifiability of an application can be determined based on a positional relationship between just the identification region of the application window, instead of the whole application window, with another application window. Therefore, for example, it is acceptable for the content region of the application window to be hidden by another application window. Accordingly, the limited display region of a portable or a compact electronic device can be efficiently utilized, and the whole of the application window that the user is paying attention to and the identification region for other applications can be appropriately displayed.

In addition, according to a predetermined scenario, when a hidden application window is moved or undergoes a change in size, the direction of that movement or size change can be determined based on an operation direction by the user. In this case, since there is an indirect relationship between the user operation and the movement of the window, the user can be avoid being confused by changes to the display of an application window that is not supposed to be being operated on.

Still further, according to another scenario, by changing the window layout or making the window layout transparent, identification information about a hidden application can be maintained in a visible state. In this case, since the application window that is not the target of the operation does not move, a more natural user interface can be provided to the user.

The series of processing carried out by each of the apparatuses described in the present specification may be typically achieved by software. Programs that compose such software achieving the series of processing may be stored in advance for example on a storage medium provided inside or outside the apparatuses.

During execution, such programs are written into random access memory (RAM) and executed by a processor such as a CPU.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A display control apparatus including:

a detection unit configured to detect a user operation; and a window control unit configured to display a plurality of application windows on a screen, and control display of each application window based on the user operation detected by the detection unit, wherein, if it is determined that it is difficult to identify a first application window associated with a first application due to at least a portion of the first application window being hidden by a second application window, the window control unit is configured to control display of the first application window so that identification information for identifying the first application is visible to a user.

(2)

The display control apparatus according to (1), wherein the window control unit is configured to determine identifiability of the first application based on a positional relationship between an identification region indicating the identification information and the second application window.

(3)

The display control apparatus according to (2), wherein the window control unit is configured to determine that it is difficult to identify the first application if a reference point in the identification region is hidden by the second application window.

(4)

The display control apparatus according to (2), wherein the window control unit is configured to determine that it is difficult to identify the first application if a predetermined ratio of the identification region is hidden by the second application window.

(5)

The display control apparatus according to any one of (2) to (4), wherein the window control unit is configured to move the first application window or to change a size of the first application window so that the identification region is visible to the user if it is determined that it is difficult to identify the first application.

(6)
The display control apparatus according to (5), wherein the window control unit is configured to determine a direction of a movement of the first application window or a direction of a change in size of the first application window based on an operation direction of the second application window.

(7)
The display control apparatus according to any one of (2) to (4), wherein the window control unit is configured to display an icon of the first application window if it is determined that it is difficult to identify the first application.

(8)
The display control apparatus according to any one of (2) to (4), wherein the window control unit is configured to change a layout of the first application window so that the identification region moves to a position that is not hidden by the second application window if it is determined that it is difficult to identify the first application.

(9)
The display control apparatus according to any one of (2) to (4), wherein the window control unit is configured to make at least a portion of the second application window overlapping the identification region transparent if it is determined that it is difficult to identify the first application.

(10)
The display control apparatus according to any one of (2) to (4), wherein the window control unit is configured to limit an operation of the second application window so that the second application window is not arranged at a position where it is difficult to identify the first application window.

(11)
The display control apparatus according to any one of (5) to (8), wherein the window control unit is configured to display second identification information different from first identification information displayed on the identification region before processing corresponding to moving, size change, icon display, or layout change on the identification region after the processing.

(12)
The display control apparatus according to (11), wherein the second identification information includes at least one among an icon, an application name, a content name, and a thumbnail of the first application.

(13)
The display control apparatus according to (12), wherein the window control unit is configured to determine the second identification information based on a format or a size of the identification region after the processing.

(14)
The display control apparatus according to any one of (1) to (13), wherein the window control unit is configured to arrange the first application window behind the second application window if a first priority level given to the first application window is lower than a second priority level given to the second application window.

(15)
The display control apparatus according to (14), wherein the window control unit is configured to arrange the first application window in front of the second application window if a predetermined user operation on the first application window is detected by the detection unit.

(16)
The display control apparatus according to any one of (2) to (13), wherein the window control unit is configured to acquire, from each application, data specifying an arrangement of the identification region in an application window to be associated with the application.

(17)
The display control apparatus according to any one of (2) to (13), wherein a position of the identification region in the application window is commonly defined across a plurality of applications.

(18)
A method of controlling display of each of a plurality of application windows based on a user operation in a display control apparatus configured to display the plurality of application windows, the method including:
determining whether it is difficult to identify a first application window associated with a first application due to at least a portion of the first application window being hidden by a second application window; and
controlling display of the first application window so that identification information for identifying the first application is visible to a user if it is determined that it is difficult to identify the first application.

(19)
A program for causing a computer in a display control apparatus configured to display a plurality of application windows on a screen to function as:
a detection unit configured to detect a user operation; and
a window control unit configured to display a plurality of application windows on a screen, and control display of each application window based on the user operation detected by the detection unit,
wherein, if it is determined that it is difficult to identify a first application window associated with a first application due to at least a portion of the first application window being hidden by a second application window, the window control unit is configured to control display of the first application window so that identification info illation for identifying the first application is visible to a user.

REFERENCE SIGNS LIST 100 display control apparatus
120 application unit
140 detection unit
150 window control unit
W1 to W5 application window

The invention claimed is:
1. A display control apparatus comprising:
a detection unit configured to detect a user operation; and
a window control unit configured to
display a plurality of application windows on a screen,
control display of a first application window, of the plurality of application windows, associated with a first application, and a second application window of the plurality of application windows, based on the user operation detected by the detection unit, wherein the first application window includes an identification region indicating first identification information for identifying the first application and a content region displaying content of the first application,
determine whether a reference point, in the identification region of the first application window, is hidden by the second application window, control the display of the first application window, based on the determination that the reference point of the first application window is hidden by the second application window, so that the first identification information for identifying the first application is visible to a user, and change a size of the first application window, based on the determination that the reference point of the first application window is hidden by the second application window, so that only the identification region is visible within the first application window, wherein the detection unit and the window control unit are each implemented via at least one processor.

2. The display control apparatus according to claim 1, wherein the window control unit is further configured to
determine whether to control the display of the first application window based on a positional relationship between the identification region indicating the first identification information and the second application window.

3. The display control apparatus according to claim 2, wherein the window control unit is further configured to
determine to control the display of the first application window if the reference point in the identification region is hidden by the second application window.

4. The display control apparatus according to claim 2, wherein the window control unit is further configured to
determine to control display of the first application window if a predetermined ratio of the identification region is hidden by the second application window.

5. The display control apparatus according to claim 2, wherein the window control unit is further configured to
move the first application window so that the identification region is visible to the user based on the determination that the reference point of the first application window is hidden by the second application window.

6. The display control apparatus according to claim 5, wherein the window control unit is further configured to
determine a direction of a movement of the first application window or a direction of a change in the size of the first application window based on an operation direction of the second application window.

7. The display control apparatus according to claim 5, wherein the window control unit is further configured to
display second identification information for identifying the first application,
wherein the second identification information is different from the first identification information,
wherein the first identification information is displayed on the identification region before processing corresponding to moving, size change, icon display, or layout change, and
wherein the second identification information is displayed on the identification region after the processing.

8. The display control apparatus according to claim 7, wherein the second identification information includes at least one among an icon, an application name, a content name, or a thumbnail of the first application.

9. The display control apparatus according to claim 8, wherein the window control unit is further configured to
determine the second identification information based on a format or a size of the identification region after the processing.

10. The display control apparatus according to claim 2, wherein the window control unit is further configured to
display an icon of the first application window if it is determined to control the display of the first application window.

11. The display control apparatus according to claim 2, wherein the window control unit is further configured to
change a layout of the first application window so that the identification region moves to a position that is not hidden by the second application window based on the determination that the reference point of the first application window is hidden by the second application window.

12. The display control apparatus according to claim 2, wherein the window control unit is further configured to
make only a portion of the second application window overlapping the identification region transparent based on the determination that the reference point of the first application window is hidden by the second application window.

13. The display control apparatus according to claim 2, wherein the window control unit is further configured to
limit an operation of the second application window so that the second application window is not arranged at a position where the reference point of the first application window is hidden by the second application window.

14. The display control apparatus according to claim 2, wherein the window control unit is further configured to
acquire, from each application, data specifying an arrangement of the identification region in an application window to be associated with the application.

15. The display control apparatus according to claim 2, wherein a position of the identification region in each application window of the plurality of application windows is commonly defined across a plurality of applications.

16. The display control apparatus according to claim 1, wherein the window control unit is further configured to
arrange the first application window behind the second application window if a first priority level given to the first application window is lower than a second priority level given to the second application window.

17. The display control apparatus according to claim 16, wherein the window control unit is further configured to
arrange the first application window in front of the second application window if a predetermined user operation on the first application window is detected by the detection unit.

18. The display control apparatus according to claim 17, wherein the window control unit is further configured to
update the first priority level given to the first application window to a higher value than the second priority level given to the second application window if the predetermined user operation on the first application window is detected by the detection unit.

19. The display control apparatus according to claim 18, wherein the window control unit is further configured to
determine whether a reference point, in the identification region of the second application window associated with a second application, is hidden by the first application window, and
replace the identification region of the second application window with another identification region of the second application window displayed outside of the first application window and the second application window, based on the determination that the identification region of the second application window is hidden by the first application window, wherein the identification region of the second application window indicates first identification information for identifying the second application, and wherein the another identification region of the second application window indicates second identification information different from the first identification information for identifying the second application.

20. The display control apparatus according to claim 1, wherein the window control unit is further configured to display, outside of the first application window and the second application window, second identification information for identifying the first application, wherein the second identification information is different from the first identification information.

21. The display control apparatus according to claim 1, wherein the window control unit is further configured to set a coordinate of each application window of the plurality of application windows as the reference point of each application window of the plurality of application windows.

22. The display control apparatus according to claim 1, wherein the reference point is positioned in a center of the identification region, at an apex of the identification region, or at a side of the identification region.

23. The display control apparatus according to claim 1, wherein the window control unit is further configured to
change the size of the first application window, based on the determination that the reference point of the first application window is hidden by the second application window, so that the content region is not visible within the first application window.

24. A display control method comprising:

detecting a user operation;

displaying a plurality of application windows on a screen;

controlling display of a first application window, of the plurality of application windows, associated with a first application and a second application window of the plurality of application windows, based on the detected user operation, wherein the first application window includes an identification region indicating first identification information for identifying the first application and a content region displaying content of the first application;

determining whether a reference point, in the identification region of the first application window, is hidden by the second application window;

controlling the display of the first application window, based on the determination that the reference point of the first application window is hidden by the second application window, so that first identification information for identifying the first application is visible to a user; and changing a size of the first application window, based on the determination that the reference point of the first application window is hidden by the second application window, so that only the identification region is visible within the first application window.

25. A non-transitory computer-readable storage medium storing a program which, when executed by a computer, causes the computer to execute a method, the method comprising:

detecting a user operation;

displaying a plurality of application windows on a screen;

controlling display of a first application window, of the plurality of application windows, associated with a first application, and a second application window of the plurality of application windows, based on the detected user operation, wherein the first application window includes an identification region indicating first identification information for identifying the first application and a content region displaying content of the first application;

determining whether a reference point, in the identification region of the first application window, is hidden by the second application window;

controlling the display of the first application window, based on the determination that the reference point of the first application window is hidden by the second application window, so that first identification information for identifying the first application is visible to a user; and changing a size of the first application window, based on the determination that the reference point of the first application window is hidden by the second application window, so that only the identification region is visible within the first application window.

* * * * *